United States Patent
Radulescu et al.

(10) Patent No.: US 11,689,950 B2
(45) Date of Patent: Jun. 27, 2023

(54) CHANNEL STATE INFORMATION REFERENCE SIGNAL MULTIPLEXING WITH SYNCHRONIZATION SIGNAL BLOCKS

(71) Applicant: QUALCOMM Incorporated, San Diego, CA (US)

(72) Inventors: Andrei Dragos Radulescu, San Diego, CA (US); Jing Sun, San Diego, CA (US); Kapil Bhattad, Bangalore (IN); Xiaoxia Zhang, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 236 days.

(21) Appl. No.: 17/024,607

(22) Filed: Sep. 17, 2020

(65) Prior Publication Data

US 2021/0092627 A1    Mar. 25, 2021

(30) Foreign Application Priority Data

Sep. 19, 2019 (IN) .............................. 201941037787

(51) Int. Cl.
*H04W 24/10* (2009.01)
*H04L 5/00* (2006.01)
(Continued)

(52) U.S. Cl.
CPC ........... *H04W 24/10* (2013.01); *H04L 1/0013* (2013.01); *H04L 5/0048* (2013.01); *H04W 56/001* (2013.01); *H04W 72/23* (2023.01)

(58) Field of Classification Search
CPC ............... H04W 24/10; H04W 56/001; H04W 72/1289; H04W 72/14; H04L 1/0013;
(Continued)

(56) References Cited

U.S. PATENT DOCUMENTS

| 2019/0215117 | A1 | 7/2019 | Lee et al. |
| 2019/0260447 | A1 | 8/2019 | Nam et al. |
| 2021/0111849 | A1* | 4/2021 | Yang .................... H04L 5/0091 |

FOREIGN PATENT DOCUMENTS

| WO | WO-2018128580 A1 | 7/2018 |
| WO | WO-2018223349 A1 * | 12/2018 |

OTHER PUBLICATIONS

Intel Corporation: "Enhancements to NR DL Signals and Channels for Unlicensed Operation", 3GPP Draft, R1-1808683, 3GPP TSG RAN WG1 Meeting #94, AI7.2.2.3.1 DRS, 3rd Generation Partnership Project (3GPP), Mobile Competence Centre, 650, Route Des Lucioles, F-06921 Sophia-Antipolis Cedex, France, vol. RAN WG1, No. Gothenburg, Sweden, Aug. 20, 2018-Aug. 24, 2018, Aug. 11, 2018, XP051516058, , 9 Pages, Retrieved from the Internet: URL:http://www.3gpp.org/ftp/tsg%5Fran/WG1%5FRL1/TSGR1%5F94/Docs/R1%2D1808683%2Ezip [retrieved on Aug. 11, 2018] Section 2, Section 2.3, Figure 2.

(Continued)

*Primary Examiner* — Hoon J Chung
(74) *Attorney, Agent, or Firm* — Holland & Hart LLP

(57) ABSTRACT

Methods, systems, and devices for wireless communications are described. A user equipment (UE) and base station may communicate in on a wireless channel of an unlicensed radio frequency spectrum band. The base station may transmit synchronization signal blocks (SSBs) in a discovery reference signal (DRS) slot. The base station may multiplex a channel state information (CSI) reference signal (CSI-RS). The base station may multiplex an aperiodic CSI-RS or a periodic CSI-RS with the SSBs in the DRS slot. For an aperiodic CSI-RS, the base station may separately trigger the CSI-RS measurement and CSI-RS reporting. For periodic CSI-RS, the base station may transmit an indication of whether the periodic CSI-RS is present.

29 Claims, 20 Drawing Sheets

(51) Int. Cl.
  *H04W 56/00* (2009.01)
  *H04L 1/00* (2006.01)
  *H04W 72/23* (2023.01)

(58) Field of Classification Search
  CPC ... H04L 1/0026; H04L 1/0027; H04L 5/0048; H04L 5/0053
  See application file for complete search history.

(56) References Cited

OTHER PUBLICATIONS

International Search Report and Written Opinion—PCT/US2020/051619—ISA/EPO—dated Apr. 14, 2021.
Huawei Hisilicon: "Independent and Joint Control of CSI-RS Transmission and CSI Reporting for NR MIMO," 3GPP Draft, 3GPP TSG RAN WG1 Meeting #87, R1-1611236, 3rd Generation Partnership Project (3GPP), Mobile Competence Centre, 650, Route Des Lucioles, F-06921, Sophia-Antipolis Cedex, France, vol. RAN WG1, No. Reno, USA, Nov. 14, 2016-Nov. 18, 2016, Nov. 13, 2016 (Nov. 13, 2016), XP051175217, 5 pages, Retrieved from the Internet: URL: http://www.3gpp.org/ftp/Meetings_3GPP_SYNC/RAN1/Docs/ [retrieved on Nov. 13, 2016] section 4.
Partial International Search Report—PCT/US2020/051619—ISA/EPO—dated Jan. 13, 2021.

\* cited by examiner

CHANNEL STATE INFORMATION REFERENCE SIGNAL MULTIPLEXING WITH SYNCHRONIZATION SIGNAL BLOCKS

CROSS REFERENCE

The present application for patent claims the benefit of India Provisional Patent Application No. 201941037787 by RADULESCU et al., entitled "CHANNEL STATE INFORMATION REFERENCE SIGNAL MULTIPLEXING WITH SYNCHRONIZATION SIGNAL BLOCKS," filed Sep. 19, 2019, assigned to the assignee hereof, and expressly incorporated by reference herein.

BACKGROUND

The following relates generally to wireless communications, and more specifically to channel state information reference signal multiplexing with synchronization signal blocks.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

SUMMARY

The described techniques relate to improved methods, systems, devices, and apparatuses that support channel state information (CSI) reference signal (CSI-RS) multiplexing with synchronization signal blocks (SSBs). Generally, the described techniques provide for a base station to multiplex CSI-RS with SSBs in a discovery reference signal (DRS) slot in a wireless communications system supporting communications on a wireless channel of a shared radio frequency spectrum band. The base station may transmit SSBs in the DRS slot so that a user equipment (UE) can discover and synchronize with the base station. In some examples, there may be transmission gaps between SSBs in a DRS slot. To increase an occupied channel bandwidth (OCB) and maintain control of the shared wireless channel during the transmission gaps, the base station may multiplex CSI-RS with SSBs during the DRS slot.

The base station may use an aperiodic CSI-RS or a periodic CSI-RS for multiplexing with SSBs. For an aperiodic CSI-RS, the base station may transmit downlink control information scheduling the aperiodic CSI-RS, such that the UE can measure or rate match around the aperiodic CSI-RS. In some cases, the base station may separately trigger aperiodic CSI-RS measurement and aperiodic CSI reporting. For example, the base station may trigger CSI measurement using downlink control information which does not grant an uplink resource, so that the UE does not transmit a measurement report for each aperiodic CSI-RS. If the base station multiplexes periodic CSI-RS with SSBs in the DRS slot, the base station may configure a window for the periodic CSI-RS. For example, the periodic CSI-RS may be configured for when DRS is transmitted and not otherwise. The base station may then transmit an indicator to the UE when the periodic CSI-RS is present within the window. This may enable the UE to rate match around the periodic CSI-RS or obtain timing information to measure the periodic CSI-RS. In some cases, the UE may identify a quasi co-location (QCL) assumption for the CSI-RS based on an SSB of the DRS slot. The base station may also indicate a CSI-RS format for the CSI-RS to assist the UE in rate matching.

A method of wireless communication at a UE is described. The method may include receiving, from a base station, an indication of an aperiodic timing occasion for transmission of a channel state information reference signal over a wireless channel of an unlicensed radio frequency spectrum band, measuring the channel state information reference signal during the aperiodic timing occasion based on the indication, detecting a channel state information report trigger to transmit a measurement report for the channel state information reference signal, where the channel state information report trigger is separate from the indication of the aperiodic timing occasion, and transmitting the measurement report to the base station on the wireless channel based on the channel state information report trigger.

An apparatus for wireless communication at a UE is described. The apparatus may include a processor, memory coupled with the processor, and instructions stored in the memory. The instructions may be executable by the processor to cause the apparatus to receive, from a base station, an indication of an aperiodic timing occasion for transmission of a channel state information reference signal over a wireless channel of an unlicensed radio frequency spectrum band, measure the channel state information reference signal during the aperiodic timing occasion based on the indication, detect a channel state information report trigger to transmit a measurement report for the channel state information reference signal, where the channel state information report trigger is separate from the indication of the aperiodic timing occasion, and transmit the measurement report to the base station on the wireless channel based on the channel state information report trigger.

Another apparatus for wireless communication at a UE is described. The apparatus may include means for receiving, from a base station, an indication of an aperiodic timing occasion for transmission of a channel state information reference signal over a wireless channel of an unlicensed radio frequency spectrum band, measuring the channel state information reference signal during the aperiodic timing occasion based on the indication, detecting a channel state information report trigger to transmit a measurement report for the channel state information reference signal, where the channel state information report trigger is separate from the indication of the aperiodic timing occasion, and transmitting the measurement report to the base station on the wireless channel based on the channel state information report trigger.

A non-transitory computer-readable medium storing code for wireless communication at a UE is described. The code may include instructions executable by a processor to receive, from a base station, an indication of an aperiodic timing occasion for transmission of a channel state information reference signal over a wireless channel of an unlicensed radio frequency spectrum band, measure the channel state information reference signal during the aperiodic timing occasion based on the indication, detect a channel state information report trigger to transmit a measurement report for the channel state information reference signal, where the channel state information report trigger is separate from the indication of the aperiodic timing occasion, and transmit the measurement report to the base station on the wireless channel based on the channel state information report trigger.

In some examples of the method, apparatuses, and non-transitory computer-readable medium described herein, receiving the indication of the aperiodic timing occasion further may include operations, features, means, or instructions for receiving downlink control information including a channel state information trigger.

In some examples of the method, apparatuses, and non-transitory computer-readable medium described herein, the downlink control information includes an uplink grant without a deterministic uplink channel resource for reporting the measurement report.

In some examples of the method, apparatuses, and non-transitory computer-readable medium described herein, the uplink grant may be directed to a group of monitoring UEs including the UE.

In some examples of the method, apparatuses, and non-transitory computer-readable medium described herein, the group of monitoring UEs includes connected UEs, idle UEs, UEs configured to monitor for a system information radio network temporary identifier, UEs configured to monitor for a paging radio network temporary identifier, UEs configured to monitor for a group common identifier, or any combination thereof.

In some examples of the method, apparatuses, and non-transitory computer-readable medium described herein, the downlink control information includes a timing offset parameter indicating that the channel state information report trigger may be transmitted in a separate transmission after the indication of the aperiodic timing occasion.

In some examples of the method, apparatuses, and non-transitory computer-readable medium described herein, the downlink control information includes a downlink grant with a channel state information request field.

In some examples of the method, apparatuses, and non-transitory computer-readable medium described herein, the downlink grant may be directed to a group of monitoring UEs including the UE.

In some examples of the method, apparatuses, and non-transitory computer-readable medium described herein, the group of monitoring UEs includes connected UEs, idle UEs, UEs configured to monitor for a system information radio network temporary identifier, UEs configured to monitor for a paging radio network temporary identifier, UEs configured to monitor for a group common identifier, or any combination thereof.

In some examples of the method, apparatuses, and non-transitory computer-readable medium described herein, the downlink grant further grants resources for a common channel, where the common channel includes a remaining minimum system information downlink shared channel, a paging downlink shared channel, an other system information downlink shared channel, or a combination thereof.

Some examples of the method, apparatuses, and non-transitory computer-readable medium described herein may further include operations, features, means, or instructions for identifying a channel state information configuration as part of a serving cell configuration associated with the base station, where the channel state information trigger may be based on the channel state information configuration.

In some examples of the method, apparatuses, and non-transitory computer-readable medium described herein, detecting the channel state information report trigger further may include operations, features, means, or instructions for detecting a trigger to transmit the measurement report for a latest received channel state information reference signal.

Some examples of the method, apparatuses, and non-transitory computer-readable medium described herein may further include operations, features, means, or instructions for identifying a quasi co-location relationship for receiving the channel state information reference signal based on one or more of the channel state information reference signal being multiplexed with a synchronization signal block, a proximity of the channel state information reference signal to a synchronization signal block, a channel state information reference signal overlapping with a half-slot including a synchronization signal block, a synchronization signal block immediately succeeding the channel state information reference signal, or a quasi co-location parameter.

Some examples of the method, apparatuses, and non-transitory computer-readable medium described herein may further include operations, features, means, or instructions for receiving an indication of a configuration for the channel state information reference signal via downlink control information or a physical broadcast channel message.

In some examples of the method, apparatuses, and non-transitory computer-readable medium described herein, the downlink control information includes the channel state information report trigger.

Some examples of the method, apparatuses, and non-transitory computer-readable medium described herein may further include operations, features, means, or instructions for rate matching a remaining minimum system information transmission around the channel state information reference signal, where the channel state information reference signal may be a non-zero power channel state information reference signal or a zero power channel state information reference signal.

A method of wireless communication at a UE is described. The method may include receiving, from a base station, an indication of a periodic timing occasion for transmission of a channel state information reference signal over a wireless channel of an unlicensed radio frequency spectrum band during a slot associated with a synchronization signal block and monitoring for an indication that the channel state information reference signal is enabled.

An apparatus for wireless communication at a UE is described. The apparatus may include a processor, memory coupled with the processor, and instructions stored in the memory. The instructions may be executable by the processor to cause the apparatus to receive, from a base station, an indication of a periodic timing occasion for transmission of a channel state information reference signal over a wireless channel of an unlicensed radio frequency spectrum band during a slot associated with a synchronization signal block and monitor for an indication that the channel state information reference signal is enabled.

Another apparatus for wireless communication at a UE is described. The apparatus may include means for receiving, from a base station, an indication of a periodic timing occasion for transmission of a channel state information reference signal over a wireless channel of an unlicensed radio frequency spectrum band during a slot associated with a synchronization signal block and monitoring for an indication that the channel state information reference signal is enabled.

A non-transitory computer-readable medium storing code for wireless communication at a UE is described. The code may include instructions executable by a processor to receive, from a base station, an indication of a periodic timing occasion for transmission of a channel state information reference signal over a wireless channel of an unlicensed radio frequency spectrum band during a slot associated with a synchronization signal block and monitor for an indication that the channel state information reference signal is enabled.

Some examples of the method, apparatuses, and non-transitory computer-readable medium described herein may further include operations, features, means, or instructions for receiving the indication that the channel state information reference signal may be enabled.

In some examples of the method, apparatuses, and non-transitory computer-readable medium described herein, the indication may be a channel occupancy time system information message.

In some examples of the method, apparatuses, and non-transitory computer-readable medium described herein, the indication may be a downlink grant including a channel state information trigger.

In some examples of the method, apparatuses, and non-transitory computer-readable medium described herein, the indication may be a downlink grant in downlink control information associated with a system information radio network temporary identifier.

Some examples of the method, apparatuses, and non-transitory computer-readable medium described herein may further include operations, features, means, or instructions for receiving a configuration for a set of individual periodic channel state information reference signal configurations with an offset corresponding to a transmission opportunity window.

Some examples of the method, apparatuses, and non-transitory computer-readable medium described herein may further include operations, features, means, or instructions for identifying a transmission opportunity window for the channel state information reference signal.

In some examples of the method, apparatuses, and non-transitory computer-readable medium described herein, the transmission opportunity window may be associated with a discovery reference signal measurement timing configuration.

Some examples of the method, apparatuses, and non-transitory computer-readable medium described herein may further include operations, features, means, or instructions for receiving a slot format indicator, where the slot format indicator may be the indication that the channel state information reference signal may be enabled, and determining the channel state information reference signal may be enabled within the transmission opportunity window based on the slot format indicator.

Some examples of the method, apparatuses, and non-transitory computer-readable medium described herein may further include operations, features, means, or instructions for receiving downlink control information scrambled by a system information radio network temporary identifier, where the downlink control information may be the indication that the channel state information reference signal may be enabled, and determining the channel state information reference signal may be enabled within the transmission opportunity window based on the downlink control information.

Some examples of the method, apparatuses, and non-transitory computer-readable medium described herein may further include operations, features, means, or instructions for receiving a configuration for a set of individual periodic channel state information reference signal configurations with an offset corresponding to the transmission opportunity window.

Some examples of the method, apparatuses, and non-transitory computer-readable medium described herein may further include operations, features, means, or instructions for receiving a configuration for a single periodic channel state information reference signal configuration with a set of offsets corresponding to the transmission opportunity window.

Some examples of the method, apparatuses, and non-transitory computer-readable medium described herein may further include operations, features, means, or instructions for identifying a quasi co-location relationship for receiving the channel state information reference signal based on one or more of the channel state information reference signal being multiplexed with a synchronization signal block, a proximity of the channel state information reference signal to a synchronization signal block, the channel state information reference signal overlapping with a half-slot including a synchronization signal block, the synchronization signal block immediately succeeding the channel state information reference signal, or a quasi co-location parameter.

Some examples of the method, apparatuses, and non-transitory computer-readable medium described herein may further include operations, features, means, or instructions for receiving an additional synchronization signal block during the slot, and receiving an additional channel state information reference signal, where the additional channel state information reference signal may be quasi co-located with the additional synchronization signal block.

Some examples of the method, apparatuses, and non-transitory computer-readable medium described herein may further include operations, features, means, or instructions for identifying a configuration for the periodic timing occasion, where the periodic timing occasion occurs with a periodicity of 80 milliseconds or 160 milliseconds.

In some examples of the method, apparatuses, and non-transitory computer-readable medium described herein, the configuration for the periodic timing occasion is indicated based on inclusion of the channel state information reference signal in a measurement object for a frequency.

Some examples of the method, apparatuses, and non-transitory computer-readable medium described herein may further include operations, features, means, or instructions for receiving an indication of a configuration for the channel state information reference signal via downlink control information or a physical broadcast channel message.

In some examples of the method, apparatuses, and non-transitory computer-readable medium described herein, the downlink control information includes a channel state information report trigger.

Some examples of the method, apparatuses, and non-transitory computer-readable medium described herein may further include operations, features, means, or instructions for rate matching a remaining minimum system information transmission around the channel state information reference signal, where the channel state information reference signal may be a non-zero power channel state information reference signal.

A method of wireless communication at a base station is described. The method may include transmitting, to a UE, an indication of a timing occasion for transmission of a channel state information reference signal over a wireless channel of an unlicensed radio frequency spectrum band during a slot that carries a synchronization signal block, transmitting the channel state information reference signal over the wireless channel, where the channel state information reference signal is multiplexed with the synchronization signal block in the slot, and transmitting to the UE a channel state information report trigger.

An apparatus for wireless communication at a base station is described. The apparatus may include a processor, memory coupled with the processor, and instructions stored in the memory. The instructions may be executable by the processor to cause the apparatus to transmit, to a UE, an indication of a timing occasion for transmission of a channel state information reference signal over a wireless channel of an unlicensed radio frequency spectrum band during a slot that carries a synchronization signal block, transmit the channel state information reference signal over the wireless channel, where the channel state information reference signal is multiplexed with the synchronization signal block in the slot, and transmit to the UE a channel state information report trigger.

Another apparatus for wireless communication at a base station is described. The apparatus may include means for transmitting, to a UE, an indication of a timing occasion for transmission of a channel state information reference signal over a wireless channel of an unlicensed radio frequency spectrum band during a slot that carries a synchronization signal block, transmitting the channel state information reference signal over the wireless channel, where the channel state information reference signal is multiplexed with the synchronization signal block in the slot, and transmitting to the UE a channel state information report trigger.

A non-transitory computer-readable medium storing code for wireless communication at a base station is described. The code may include instructions executable by a processor to transmit, to a UE, an indication of a timing occasion for transmission of a channel state information reference signal over a wireless channel of an unlicensed radio frequency spectrum band during a slot that carries a synchronization signal block, transmit the channel state information reference signal over the wireless channel, where the channel state information reference signal is multiplexed with the synchronization signal block in the slot, and transmit to the UE a channel state information report trigger.

Some examples of the method, apparatuses, and non-transitory computer-readable medium described herein may further include operations, features, means, or instructions for monitoring the wireless channel for a measurement report from the UE based on the channel state information reference signal and the channel state information report trigger.

Some examples of the method, apparatuses, and non-transitory computer-readable medium described herein may further include operations, features, means, or instructions for transmitting remaining minimum system information on a downlink shared channel without rate matching around the channel state information reference signal.

In some examples of the method, apparatuses, and non-transitory computer-readable medium described herein, indicating the timing occasion further may include operations, features, means, or instructions for transmitting downlink control information including a channel state information trigger to indicate the timing occasion, where the channel state information reference signal may be an aperiodic channel state information reference signal.

In some examples of the method, apparatuses, and non-transitory computer-readable medium described herein, the downlink control information includes an uplink grant without a deterministic uplink shared channel resource associated with the channel state information reference signal.

In some examples of the method, apparatuses, and non-transitory computer-readable medium described herein, the downlink control information includes a parameter indicating that the channel state information reference signal report trigger may be transmitted in a separate transmission after the indication of the timing occasion.

In some examples of the method, apparatuses, and non-transitory computer-readable medium described herein, the downlink control information includes a downlink grant with a channel state information request field.

Some examples of the method, apparatuses, and non-transitory computer-readable medium described herein may further include operations, features, means, or instructions for establishing a channel state information configuration as part of a serving cell configuration associated with the base station, where the channel state information trigger may be based on the channel state information configuration.

In some examples of the method, apparatuses, and non-transitory computer-readable medium described herein, transmitting the channel state information report trigger further may include operations, features, means, or instructions for triggering the UE to transmit the measurement report for a latest received channel state information reference signal.

In some examples of the method, apparatuses, and non-transitory computer-readable medium described herein, transmitting the indication of the timing occasion for transmission of the channel state information reference signal further may include operations, features, means, or instructions for indicating that transmission of the channel state information reference signal may be enabled, where the channel state information reference signal may be a periodic channel state information reference signal.

In some examples of the method, apparatuses, and non-transitory computer-readable medium described herein, that transmission of the channel state information reference signal may be enabled further may include operations, features, means, or instructions for transmitting a channel occupancy time system information message.

In some examples of the method, apparatuses, and non-transitory computer-readable medium described herein, indicating that transmission of the channel state information reference signal may be enabled further may include operations, features, means, or instructions for transmitting a downlink grant including a channel state information trigger.

In some examples of the method, apparatuses, and non-transitory computer-readable medium described herein, indicating that transmission of the channel state information reference signal may be enabled further may include operations, features, means, or instructions for transmitting a downlink grant in downlink control information associated with a system information radio network temporary identifier.

Some examples of the method, apparatuses, and non-transitory computer-readable medium described herein may further include operations, features, means, or instructions for configuring a transmission opportunity window for the periodic channel state information reference signal.

Some examples of the method, apparatuses, and non-transitory computer-readable medium described herein may further include operations, features, means, or instructions for transmitting, separately, an offset for each periodic channel state information reference signal resource in the transmission opportunity window.

In some examples of the method, apparatuses, and non-transitory computer-readable medium described herein, the transmission opportunity window may be associated with a discovery reference signal measurement timing configuration.

Some examples of the method, apparatuses, and non-transitory computer-readable medium described herein may further include operations, features, means, or instructions for transmitting a slot format indicator to indicate a presence of the periodic channel state information reference signal in the transmission opportunity window.

Some examples of the method, apparatuses, and non-transitory computer-readable medium described herein may further include operations, features, means, or instructions for transmitting downlink control information to indicate a presence of the periodic channel state information reference signal in the transmission opportunity window.

Some examples of the method, apparatuses, and non-transitory computer-readable medium described herein may further include operations, features, means, or instructions for indicating a quasi co-location relationship for the channel state information reference signal based on one or more of the channel state information reference signal being multiplexed with a synchronization signal block, a proximity of the channel state information reference signal to a synchronization signal block, the channel state information reference signal overlapping with a half-slot including a synchronization signal block, a synchronization signal block immediately succeeding the channel state information reference signal, or transmitting a quasi co-location parameter.

Some examples of the method, apparatuses, and non-transitory computer-readable medium described herein may further include operations, features, means, or instructions for transmitting an additional synchronization signal block during the slot, and transmitting an additional channel state information reference signal, where the additional channel state information reference signal may be quasi co-located with the additional synchronization signal block.

Some examples of the method, apparatuses, and non-transitory computer-readable medium described herein may further include operations, features, means, or instructions for transmitting an indication of a configuration for the channel state information reference signal via downlink control information or a physical broadcast channel message.

In some examples of the method, apparatuses, and non-transitory computer-readable medium described herein, the downlink control information includes the channel state information report trigger.

Some examples of the method, apparatuses, and non-transitory computer-readable medium described herein may further include operations, features, means, or instructions for rate matching a remaining minimum system information transmission around the channel state information reference signal, where the channel state information reference signal may be a non-zero power channel state information reference signal.

A method of wireless communication at a UE is described. The method may include receiving, from a base station, an indication of a timing occasion for transmission of a channel state information reference signal over a wireless channel of an unlicensed radio frequency spectrum band during a slot that carries a synchronization signal block, identifying that the channel state information reference signal is quasi co-located with the synchronization signal block, measuring the channel state information reference signal during the timing occasion based on the channel state information reference signal being quasi co-located with the synchronization signal block, detecting a channel state information report trigger to transmit a measurement report for the channel state information reference signal, and transmitting the measurement report to the base station on the wireless channel based on the channel state information report trigger.

Some examples of the method described herein may further include operations or features for receiving downlink control information including a channel state information trigger, where the channel state information reference signal is an aperiodic channel state information reference signal.

Some examples of the method described herein may further include operations or features for determining that transmission of the channel state information reference signal is enabled, where the channel state information reference signal is a periodic channel state information reference signal.

DETAILED DESCRIPTION

Figure 1:
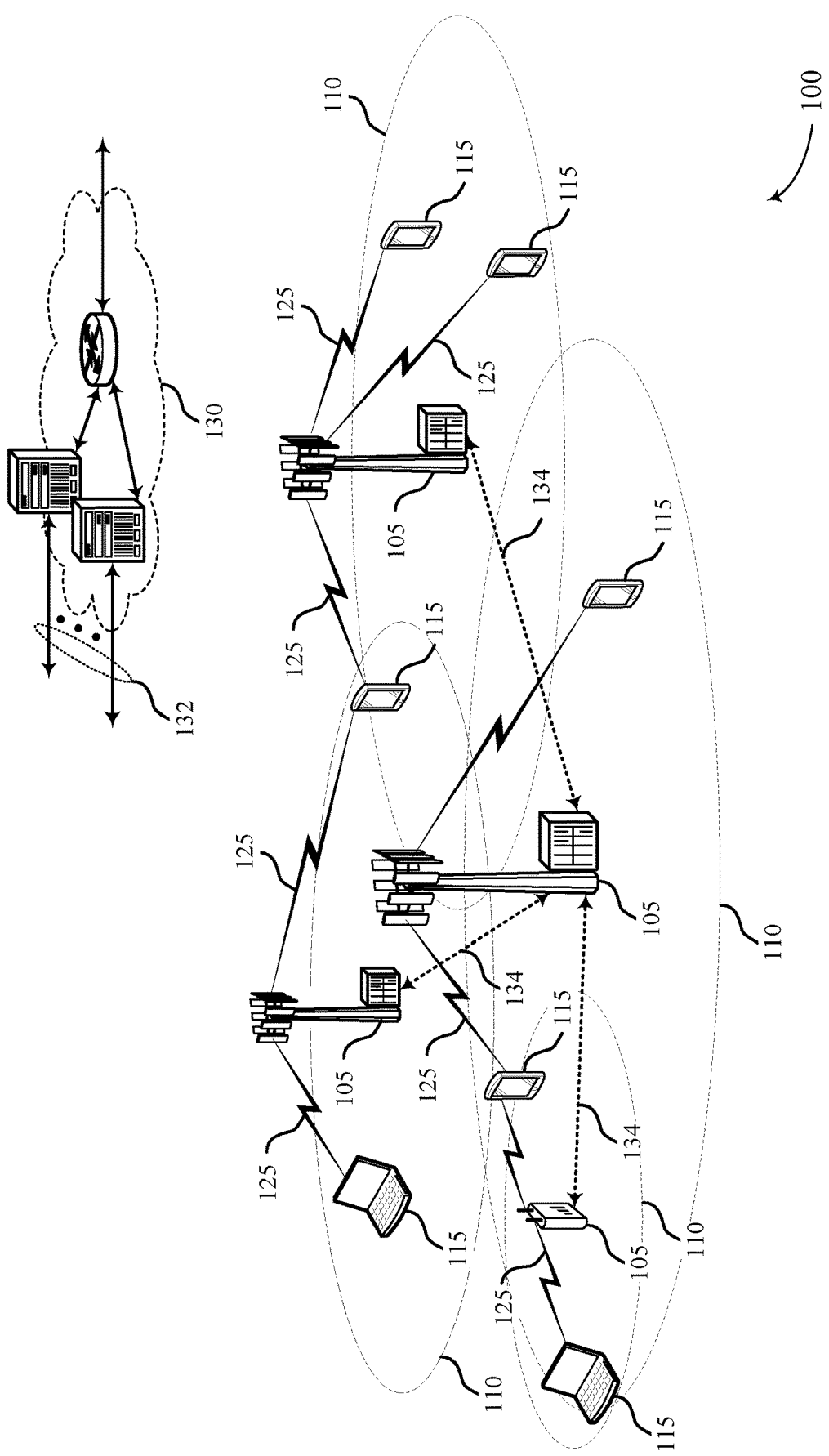
FIG. 1 illustrates an example of a system for wireless communications that supports channel state information reference signal multiplexing with synchronization signal blocks in accordance with aspects of the present disclosure.

Some wireless communications systems support unlicensed or shared communications. A wireless device, such as a user equipment (UE) or a base station, may perform a clear channel assessment (CCA), such as listen-before-talk (LBT), prior to gaining control of a wireless channel in the unlicensed wireless communications system. In some of these systems, a base station may gain access to the wireless channel and transmit a synchronization signal block (SSB), such as during a discovery reference signal (DRS) slot. The SSB may carry synchronization signals and reference signals for a UE to discover and synchronize with the base station. In some examples, there may be transmission gaps between SSBs in a DRS slot. In unlicensed wireless communications, another wireless device may attempt to gain control of the transmission medium during a transmission gap between SSBs, which may interrupt the DRS slot at the base station. The base station would then wait for the other wireless device to finish transmitting, attempt to regain control of the transmission medium, and transmit SSBs in another DRS slot.

Wireless devices operating in a wireless communications system described herein may implement techniques to increase an occupied channel bandwidth (OCB) in an unlicensed wireless communications system. For example, a base station may multiplex channel state information (CSI) reference signals (CSI-RS) with SSBs during a DRS slot. In some cases, by multiplexing CSI-SR with SSBs during the DRS slot, the base station may prevent another wireless device from gaining control of the wireless channel before the DRS slot finishes. A base station may configure an aperiodic CSI-RS or a periodic CSI-RS for multiplexing with SSBs. In some cases, such as to trigger an aperiodic CSI-RS, the base station may transmit downlink control information (DCI) that grants an uplink resource for a UE to transmit a measurement report.

The techniques described herein may support DCI which triggers aperiodic CSI-RS but does not allocate an uplink resource, such that a UE does not transmit a CSI report for each aperiodic CSI-RS transmitted in the DRS slot. For example, the base station may trigger CSI measurement using DCI which does not grant an uplink shared channel resource. In some cases, the base station may transmit an uplink grant to trigger CSI measurement, but the uplink grant may not have an associated uplink resource. In some other examples, the base station may add a CSI trigger to a downlink grant. In some cases, the base station may transmit separate triggers for CSI-RS measurement and CSI reporting. To trigger the reporting, the base station may transmit DCI with a CSI trigger such that a most recent instance of CSI report is reported. This may enable the UE to transmit a measurement report for a recently measured CSI-RS (e.g., measured before receiving the reporting trigger). In some cases, the base station may trigger the UE to just measure a CSI-RS, to just report CSI, or to both measure CSI-RS and report the CSI measurement. In some examples, the base station may trigger multiple UEs to measure the same CSI-RS, such as by triggering CSI-RS measurement with a group common DCI or by scrambling the triggering DCI with a certain type of radio network temporary identifier (RNTI).

The base station may multiplex periodic CSI-RS with SSBs in the DRS slot. In some cases, the base station may configure a window for the periodic CSI-RS. For example, the periodic CSI-RS may be configured for just when DRS is transmitted and not otherwise. Therefore, the periodic CSI-RS may be associated with the window, and the periodic CSI-RS may not be present outside of the window. The base station may transmit an indicator to the UE when the periodic CSI-RS is present within the window. This may enable the UE to rate match around the periodic CSI-RS or obtain timing information to measure the periodic CSI-RS. In some cases, the base station may indicate the presence of the periodic CSI-RS via DCI or by transmitting a slot format indicator with a certain value. The UE may identify a quasi co-location (QCL) assumption for the CSI-RS based on an SSB of the DRS slot. The base station may also indicate a CSI-RS format used to assist the UE in rate matching.

Aspects of the disclosure are initially described in the context of a wireless communications system. Aspects of the disclosure are further illustrated by and described with reference to apparatus diagrams, system diagrams, and flowcharts that relate to channel state information reference signal multiplexing with synchronization signal blocks.

FIG. 1 illustrates an example of a wireless communications system 100 that supports channel state information reference signal multiplexing with synchronization signal blocks in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ LBT procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s = 1/30,720,000$ seconds. Time intervals of a communications resource may be organized according to radio frames each having a duration of 10 milliseconds (ms), where the frame period may be expressed as $T_f = 307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A base station 105 in the wireless communications system 100 may multiplex CSI-RS with SSBs in a DRS slot of a wireless channel of a shared radio frequency spectrum band. The base station 105 may transmit SSBs in the DRS slot so that a UE 115 can discover and synchronize with the base station 105. In some examples, there may be transmission gaps between SSBs in a DRS slot. To increase an OCB and maintain control of the shared wireless channel during the transmission gaps, the base station 105 may multiplex CSI-RS with SSBs during the DRS slot.

The base station 105 may use an aperiodic CSI-RS or a periodic CSI-RS for multiplexing with SSBs. For an aperiodic CSI-RS, the base station 105 may transmit downlink control information scheduling the aperiodic CSI-RS, such that the UE 115 can measure or rate match around the aperiodic CSI-RS. In some cases, the base station 105 may separately trigger aperiodic CSI-RS measurement and aperiodic CSI reporting. For example, the base station 105 may trigger CSI measurement using downlink control information which does not grant an uplink resource, so that the UE 115 does not transmit a measurement report for each aperiodic CSI-RS. If the base station 105 multiplexes periodic CSI-RS with SSBs in the DRS slot, the base station 105 may configure a window for the periodic CSI-RS. For example, the periodic CSI-RS may be configured for when DRS is transmitted and not otherwise. The base station 105 may then transmit an indicator to the UE 115 when the periodic CSI-RS is present within the window. This may enable the UE 115 to rate match around the periodic CSI-RS or obtain timing information to measure the periodic CSI-RS. In some cases, the UE 115 may identify a QCL assumption for the CSI-RS based on an SSB of the DRS slot. The base station 105 may also indicate a CSI-RS format for the CSI-RS to assist the UE 115 in rate matching.

Figure 2:
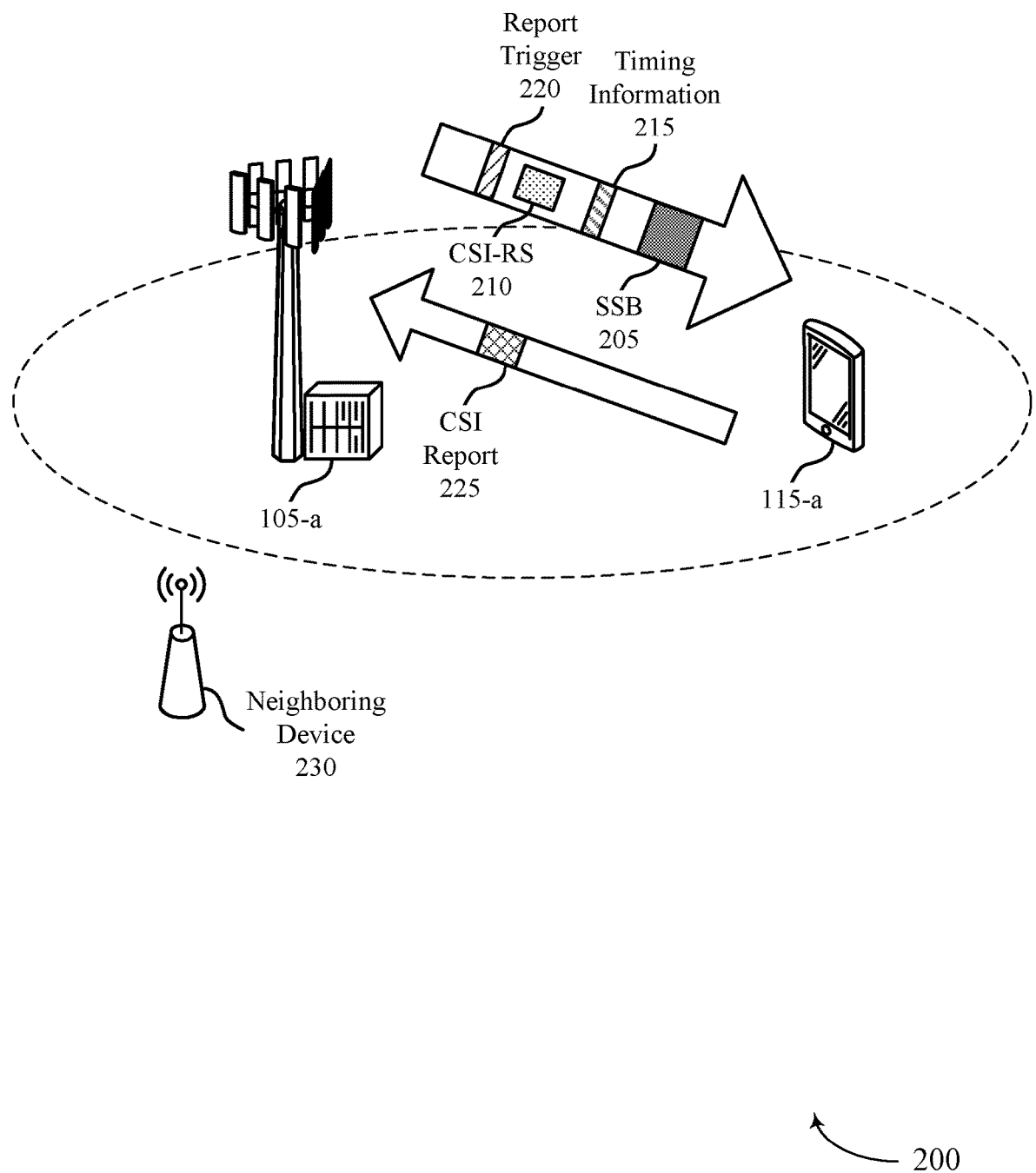
FIG. 2 illustrates an example of a wireless communications system that supports channel state information reference signal multiplexing with synchronization signal blocks in accordance with aspects of the present disclosure.

FIG. 2 illustrates an example of a wireless communications system 200 that supports channel state information reference signal multiplexing with synchronization signal blocks in accordance with aspects of the present disclosure. In some examples, wireless communications system 200 may implement aspects of wireless communication system 100. The wireless communications system may include base station 105-a and UE 115-a, which may be respective examples of a base station 105 and a UE 115 as described with reference to FIG. 1.

The wireless communications systems 200 may support unlicensed communications. For example, base station 105-a may perform a CCA procedure, such as LBT, to gain control of a transmission medium and wirelessly communicate with other devices, such as UE 115-a. If base station 105-a does not detect another wireless device using the transmission medium (e.g., base station 105-a determines the channel is clear), then base station 105-a may reserve the transmission medium and begin the wireless communications.

In some cases, base station 105-a may gain access to the transmission medium and transmit an SSB 205. The SSB 205 may include synchronization signals, such as a primary synchronization signal (PSS) and a secondary synchronization signal (SSS), and a physical broadcast channel (PBCH) carrying data (e.g., a master information block (MIB)) and reference signals (e.g., demodulation reference signals (DMRS)). In some cases, the SSB 205 may be referred to as, or include aspects of, an SS/PBCH block. A UE 115 may receive the SSB 205, synchronize with base station 105-a based on the synchronization signals and reference signals, and use the system information to establish communications with base station 105-a. In some examples, base station 105-a may transmit perform a high priority LBT procedure to gain control of the wireless channel for a DRS slot.

Base station 105-a may gain access to the wireless communications medium and transmit the SSB 205 in a DRS slot. In some cases, SSBs in a DRS slot may not be contiguous, such that there may be a gap between a first SSB and a second SSB. With a transmission gap in the DRS slot, another wireless device (e.g., a neighboring wireless device 230) may attempt to gain control of the transmission medium during the transmission gap, which would interrupt the DRS slot at base station 105-a. Base station 105-a would then wait for the neighboring wireless device 230 to finish transmitting and perform another CCA procedure in an attempt to regain control of the transmission medium. This may prevent UEs 115 from receiving synchronization information and connecting to base station 105-a or may delay the reception of synchronization information.

The wireless communications system 200 may support multiplexing SSBs (e.g., such as SSB 205) with reference signals, such as CSI-RS. For example, base station 105-a may transmit CSI-RS 210 during the DRS slot to increase channel occupancy and, for example, fulfil occupied channel bandwidth (OCB) requirements. In some examples, these techniques may prevent the neighboring wireless device 230 from gaining control of the wireless medium between SSB transmissions. In some cases, base station 105-a may multiplex a CSI-RS 210 with SSBs to meet OCB requirements.

In some cases, the CSI-RS 210 multiplexed with SSBs in a DRS slot may be used to provide channel estimation for burst traffic in a loaded environment. Multiplexing the CSI-RS 210 with SSBs in the DRS slot may reduce load in the shared medium, decrease CSI-RS monitoring (e.g., as DRS may use a higher priority LBT), and UEs 115 in a discontinuous reception (DRX) mode may be expected to monitor DRS for radio link management (RLM) maintenance.

The wireless communications system 200 may support multiplexing CSI-RS 210, where CSI-RS 210 may be an aperiodic CSI-RS or a periodic CSI-RS. In some cases, base station 105-a may use an aperiodic CSI-RS for SSB multiplexing when communicating unicast data. In some cases, an aperiodic CSI-RS may be partially used, for example, as filler to occupy the channel and prevent another wireless device from gaining control of the channel. In some cases, the techniques for multiplexing CSI-RS 210 with SSBs may be used for radio resource management.

Base station 105-a may configure UE 115-a for the aperiodic CSI-RS. In some cases, base station 105-a may transmit an uplink grant to trigger an aperiodic CSI-RS measurement and report. The uplink grant may indicate uplink shared channel resources for UE 115-a to transmit a measurement report for the CSI-RS. However, it may not be efficient for UE 115-a to transmit a CSI report for each aperiodic CSI-RS triggered in the DRS slot. In some cases, UE 115-a may increase efficiency by holding on to the CSI and transmitting a measurement report at a later time. For example, the CSI report may not be critical, and a delayed measurement report may more efficiently share the wireless channel with other devices. Additionally, the uplink grant to trigger CSI reporting may require at least one UE 115 in connected mode.

Therefore, the wireless communications system 200 may support separately triggering CSI-RS measurement and CSI reporting. In an example, base station 105-a may use a CSI triggering DCI which does not have an associated physical uplink shared channel (PUSCH) resource. The triggering DCI may be an uplink grant without an associated uplink resource. For example, an uplink shared channel (e.g., UL-SCH) indicator bit may be set to 0. In some cases, the triggering DCI may be an example of a Format 0_1 DCI. In some cases, the triggering DCI may include some bit values or combinations to indicate that there is no PUSCH at all. For example, the DCI may include a non-numerical timing offset value (e.g., a non-numerical K2 value). The non-numerical timing offset value, which may, in some cases, indicate a number of slots or symbol periods between a physical downlink control channel (PDCCH) carrying a grant and the actual resources which are granted, may be set to a value to indicate that there are no granted uplink shared channel resources (e.g., for a measurement report). UE 115-a may identify the timing offset and determine that CSI reporting may be triggered at a later time.

In some cases, base station 105-a may trigger an aperiodic CSI for a group of UEs 115 (e.g., including UE 115-a). For example, base station 105-a may transmit a group common PDCCH (GC-PDCCH) to trigger multiple UEs 115 to measure the same aperiodic CSI-RS. Aperiodic CSI-RS triggered by GC-PDCCH may also not have an associated CSI report. A CSI report 225 for the aperiodic CSI-RS triggered by GC-PDCCH may also be separately triggered. In some examples, base station 105-a may trigger other groups of UEs 115 to measure the same aperiodic CSI-RS. For example, base station 105-a may trigger connected UEs 115, idle UEs 115, UEs 115 listening for system information RNTI, UEs 115 listening for paging RNTI, UEs 115 configured to monitor for a group common identifier, etc., to measure the same aperiodic CSI-RS. Similarly, a CSI report 225 for the aperiodic CSI-RS measured by the group of UEs may have a separately triggered CSI report.

In an example, base station 105-a may transmit CSI triggering DCI (e.g., the timing information 215) to UE 115-a indicating timing information for an aperiodic CSI-RS (e.g., the CSI-RS 210). UE 115-a may then measure the CSI-RS 210 based on the triggering DCI. In some cases, UE 115-a may not immediately transmit a measurement report for the CSI-RS 210, as the triggering DCI may be an example of an uplink grant without an uplink shared channel resource allocation (e.g., without a deterministic uplink shared channel resource). For example, the timing information 215 may not trigger the CSI report 225, but the timing information 215 may trigger CSI-RS measurement at UE 115-a, or the timing information 215 may indicate timing information or multiplexing information for the CSI-RS 210.

In some other example, base station 105-a may add a CSI trigger to DCI which does not support CSI report triggering in other systems. For example, base station 105-a may transmit the timing information 215, which may be an example of a downlink grant with a CSI request field. The CSI request field may be, for example, six or fewer bits. In some cases, the DCI with the CSI trigger may be an example of a Format 1_0 DCI, which may be used for channel occupancy time (COT) system information (COT-SI). This DCI may not generally include a grant for uplink resources, though UE 115-a may later transmit a measurement report in an uplink-granted resource associated with a CSI report trigger 220. In some examples, the downlink grant may be used to grant resources for a common channel, such as remaining minimum system information (RMSI) physical downlink shared channel (PDSCH), paging PDSCH, or other system information PDSCH.

In some cases, base station 105-a may configure CSI in a common serving cell configuration instead of dedicated CSI-RS configurations for each served UE 115. For example, an aperiodic CSI-RS measurement trigger may be common for each UE 115 served by base station 105-a. UEs 115 served by base station 105-a may then measure the common CSI-RS. In some cases, the timing information 215 (e.g., the measurement trigger) may be transmitted in a group common PDCCH. In some cases, base station 105-a may associate the CSI configuration with monitoring UEs 115. Some UEs 115 may follow cell-specific reference signals with other QCL associations, and these UEs may not measure the common CSI reference signals.

In some cases, at a later time, base station 105-a may transmit a report trigger 220 to UE 115-a. The report trigger 220 may trigger UE 115-a to transmit a measurement report for the CSI-RS 210. In some cases, UE 115-a may transmit a CSI report 225 for a previously received CSI-RS. In some systems, an aperiodic CSI-RS may be transmitted after or with a DCI triggering a CSI report. However, a UE 115 in the wireless communications system 200 may support transmitting a CSI report 225 for a CSI-RS 210 received prior to the report trigger 220. For example, UE 115-a may buffer a measurement report for the CSI-RS 210 until triggered to transmit the CSI report 225. In some cases, if UE 115-a measures multiple CSI-RS prior to being triggered to transmit the CSI report 225, UE 115-a may transmit a CSI report 225 for a most recently measured CSI-RS. In some cases, base station 105-a may trigger the CSI report 225 later so that UE 115-a can transmit the CSI with other data or to better share access to the channel with other wireless devices.

The report trigger 220 may be an example of CSI triggering DCI. For example, if a CSI trigger in the DCI includes an indication of a CSI report, UE 115-a may transmit the CSI report 225 for a recently measured CSI-RS 210. In some cases, the report trigger 220 may request a CSI report for a specific CSI-RS 210. For example, the report trigger 220 may trigger a report for a recently measured CSI-RS 210, a previous CSI-RS, an averaged CSI measurement, or a combination thereof.

The report trigger 220 may trigger a CSI report 225, a CSI measurement, or both. In some cases, the report trigger 220 may use separate bits in a bitmap to trigger a CSI report measurement and to trigger a CSI report reporting. In some cases, the report trigger 220 may use separate bits in the bitmap to trigger CSI report measurement and reporting (e.g., the report trigger 220 can trigger both a measurement and a report) and to trigger just a CSI report measurement. In some examples, the CSI report 225 may be a low priority report that can be dropped (e.g., if UE 115-a has higher priority information to transmit instead).

In some examples, base station 105-a may configure a periodic CSI-RS to multiplex with SSBs in the DRS slot. In some cases, when a periodic CSI-RS is configured, a periodic CSI-RS may be assumed to always be transmitted and have periodic resources allocated. If base station 105-a has unicast downlink data on the same resources, base station 105-a and the receiving device may rate match around the resources for the periodic CSI-RS. When base station 105-a configures a periodic CSI-RS, base station 105-a may implement techniques to indicate to UE 115-a that the periodic CSI-RS is enabled, such that UE 115-a can rate match downlink shared channel transmissions around the periodic CSI-RS. In some cases, the periodic CSI-RS may be a common periodic CSI-RS (e.g., for UEs 115 served by base station 105-a).

Base station 105-a may transmit the timing information 215 to UE 115-a as an indication of a presence of a periodic CSI-RS. In some cases, a COT-SI transmission may indicate the presence of the periodic CSI-RS. The COT-SI may be transmitted using control resources (e.g., PDCCH). Upon detection of a COT-SI transmission, UE 115-a may rate match downlink shared channel transmissions from base station 105-a around the periodic CSI-RS and decode the downlink shared channel transmissions based on detecting the COT-SI. In some examples, downlink shared channel grants may indicate the presence of the periodic CSI-RS. For example, a Format 1_0 downlink grant may include a CSI trigger (e.g., an aperiodic CSI-RS trigger), which may be similar to a zero power CSI-RS trigger. For example, for rate matching, the target UE 115 may acquire an additional CSI-RS configuration (e.g., a QCL configuration) in a separate configuration or signaling. A Format 1_1 downlink grant may be configured to be applicable to a system information (SI) RNTI. In some cases, COT-SI may include Format 1_0 fields. For example, COT-SI may be used to grant downlink shared channel resources for RMSI. The COT-SI may include indicators for frequency domain and time domain resources, an MCS, and a SI indicator.

In some examples, base station 105-a may configure a window (e.g., a transmission opportunity window) for the periodic CSI-RS. In some cases, the window may be configured just during DRS slots and not configured otherwise. In a first example, the size of the window may be very large (e.g., without a configured beginning or end), and base station 105-*a* may transmit a trigger for when a UE 115 is to measure the periodic CSI-RS. For example, the periodic CSI-RS may be configured to always be "on," and base station 105-*a* may utilize a trigger to indicate timing information 215 when the periodic CSI-RS is actually transmitted. In another example, the window may correspond to a DRS measurement timing configuration (DMTC) window. In some examples, only some transmissions in the window may correspond to the DRS slot and benefit from the presence of periodic CSI-RS. Therefore, in some examples, base station 105-*a* may avoid transmitting a common periodic CSI-RS outside of the DRS slot. Base station 105-*a* may, in some cases, use a trigger to indicate the presence of a common periodic CSI-RS within the window.

In some cases, base station 105-*a* may indicate the presence of periodic CSI-RS based on a DCI transmission. In some cases, upon detecting the presence of periodic CSI-RS, UE 115-*a* may perform a measurement on the periodic CSI-RS and generate CSI. Additionally, or alternatively, UE 115-*a* may rate match around the periodic CSI-RS based on detecting the presence of the periodic CSI-RS. For example, UE 115-*a* detect the presence of a PDCCH DCI based on the PDCCH DCI being scrambled with SI RNTI. In some cases, the presence of periodic CSI-RS may be indicated via DCI with Format 1_0 scrambled by SI RNTI. Additionally, or alternatively, base station 105-*a* may indicate the presence of the periodic CSI-RS by transmitting a slot format indicator (SFI) with a particular slot format combination. For example, a certain value of a bitmap for the SFI may indicate that periodic CSI-RS is present. In some cases, an SFI value which indicates the periodic CSI-RS measurement within a DRS slot may be interpreted differently at a time outside of the DRS slot. For example, an SFI indicating all downlink symbol periods in the DRS slot may indicate the presence of periodic CSI-RS, but an SFI indicating all downlink symbol periods outside of the DRS slot may actually be used to indicate all downlink symbol periods.

The wireless communications system 200 may support techniques for a UE 115 to identify a QCL assumption to apply when receiving the CSI-RS 210 multiplexed with SSBs in a DRS slot. In some cases, UE 115-*a* may not have a QCL assumption configured for the CSI-RS 210. Therefore, UE 115-*a* may determine a QCL assumption based, for example, on the SSB 205 transmitted in the DRS slot. Some example configurations of CSI-RS and SSB multiplexing are described with reference to FIG. 3, and techniques for a UE 115 to identify a QCL assumption for different configurations are further described as well.

In some cases, base station 105-*a* may indicate a format of the CSI-RS 210 to UE 115-*a*. In some cases, the format may be indicated for idle UEs 115 in case RMSI PDSCH is rate-matched around the CSI-RS 210. Connected UEs 115 may use the CSI-RS format to measure the CSI-RS 210 and generate a measurement report as well as for RMSI acquisition. In some cases, the CSI-RS configuration may be indicated via a triggering DCI (e.g., the timing information 215 or the report trigger 220) or via PBCH (e.g., in the SSB 205). In some cases, a UE 115 may be configured with a set of CSI-RS formats, and the CSI-RS format indication may indicate a format from the set. In some cases, RMSI may rate match around non-zero power CSI-RS in the DRS slot. The RMSI allocation may handle or treat RMSI CSI-RS as zero-power (ZP) CSI-RS. For example, base station 105-*a*, when allocating resources for RMSI, may treat RMSI CSI-RS as non-zero power (NZP) CSI-RS. Similarly, UE 115-*a* may treat RMSI CSI-RS as NZP CSI-RS (e.g., when monitoring for RMSI). In some cases, RMSI CSI-RS may be signaled (e.g., by base station 105-*a*) as zero power CSI-RS.

Figure 3:
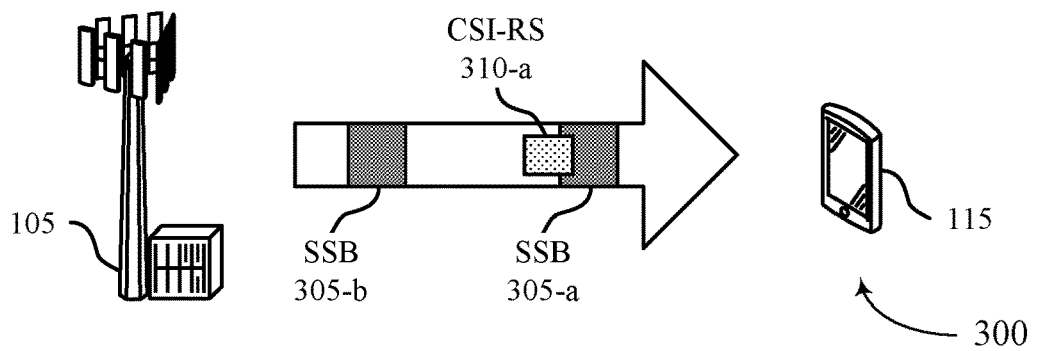
FIG. 3 illustrates examples of CSI-RS and SSB multiplexing configurations that support channel state information reference signal multiplexing with synchronization signal blocks in accordance with aspects of the present disclosure.

FIG. 3 illustrates examples of CSI-RS and SSB multiplexing configurations 300, 301, and 302 that support channel state information reference signal multiplexing with synchronization signal blocks in accordance with aspects of the present disclosure. In some examples, CSI-RS and SSB multiplexing configurations 300, 301, and 302 may implement aspects of wireless communication system 100.

A base station 105 may multiplex an SSB 305 with a CSI-RS 310 within a DRS slot. A UE 115 triggered to measure the CSI-RS 310 may determine a QCL assumption for a receive beam when receiving the CSI-RS 310. For example, the UE 115 may adjust an antenna array to receive the CSI-RS based on reception parameters or configurations used to receive another signal. For example, if the CSI-RS 310 is QCL associated with a DMRS of an SSB 305, then the UE 115 may use a similar, or the same, reception configuration to receive the CSI-RS as the reception configuration used to receive the associated DMRS.

In a first CSI-RS and SSB multiplexing configuration 300, CSI-RS 310-*a* may overlap at least one symbol period of SSB 305-*a*. For example, CSI-RS 310-*a* may be multiplexed in a symbol with SSB 305-*a*. In this example, the UE 115 measuring CSI-RS 310-*a* may derive QCL for CSI-RS 310-*a* from SSB 305-*a*.

In a second CSI-RS and SSB multiplexing configuration 301, CSI-RS 310-*b* may be transmitted between two SSBs 305, including SSB 305-*c* and SSB 305-*d*. In this example, CSI-RS 310-*b* may be transmitted after SSB 305-*c* (e.g., in the time domain) and before SSB 305-*d*. In this example, the UE 115 measuring CSI-RS 310-*b* may derive QCL for CSI-RS 310-*b* from the immediately preceding SSB candidate QCL (e.g., from the QCL for SSB 305-*c*). In another example, if a CSI-RS 310 is transmitted at the end of an SSB slot, the UE 115 may derive QCL for the CSI-RS 310 based on the immediately preceding SSB candidate QCL.

In a third CSI-RS and SSB multiplexing configuration 302, CSI-RS 310-*c* may be transmitted between two SSBs 305, including SSB 305-*e* and SSB 305-*f* In this example, CSI-RS 310-*d* may be transmitted after SSB 305-*e* (e.g., in the time domain) and before SSB 305-*f* In this example, the UE 115 measuring CSI-RS 310-*c* may derive QCL for CSI-RS 310-*c* from the SSB candidate closest to the first symbol of CSI-RS 310-*c*. In this example, SSB 305-*f* may be closer (e.g., based on a distance 315) to the first symbol of CSI-RS 310-*c* than SSB 305-*e*. Therefore, the UE 115 may derive a QCL assumption for CSI-RS 310-*c* based on SSB 305-*f*.

In some examples, these techniques may be applied for multiplexing aperiodic CSI-RS, periodic CSI-RS, or both. In some cases, the base station 105 may indicate a QCL relationship for an aperiodic CSI-RS in DCI triggering the aperiodic CSI-RS. In some cases, such as for periodic CSI-RS multiplexing, the base station 105 may configure a QCL configuration via RRC. Periodic CSI-RS multiplexing may not have a per-CSI-RS triggering DCI, so the base station 105 may configure the QCL determination beforehand, such as via RRC. The configuration may indicate which from which SSB 305 in a slot the UE 115 is to determine QCL. For example, if a CSI-RS 310 is transmitted between two SSBs 305, a QCL determination configuration may indicate for the UE 115 to determine a QCL assumption for the CSI-RS based on the preceding SSB 305 (e.g., as described with reference to the second CSI-RS and SSB multiplexing configuration 301) or based on the closest SSB 305 (e.g., as described with reference to the third CSI-RS and SSB multiplexing configuration 302). In some cases, a UE 115 in idle mode may not acquire CSI-RS 310, or it may not be a high priority for the idle mode UE 115, so the RRC configuration may be signaled via RMSI or an RRC message (e.g., after establishing an RRC connection).

In some cases, the UE 115 may not acquire the SSB 305 to establish QCL. For example, the UE 115 may determine an SSB candidate beam index to identify the QCL assumption. The UE 115 may determine the SSB candidate beam index from, for example, the Q factor of the DRS. In some cases, the base station 105 may transmit two CSI-RS, such as if two non-QCLed SSBs are signaled in a DRS slot. In this example, the first CSI-RS may be QCLed with the first SSB, and the second CSI-RS may be QCLed with the second SSB.

Figure 4:
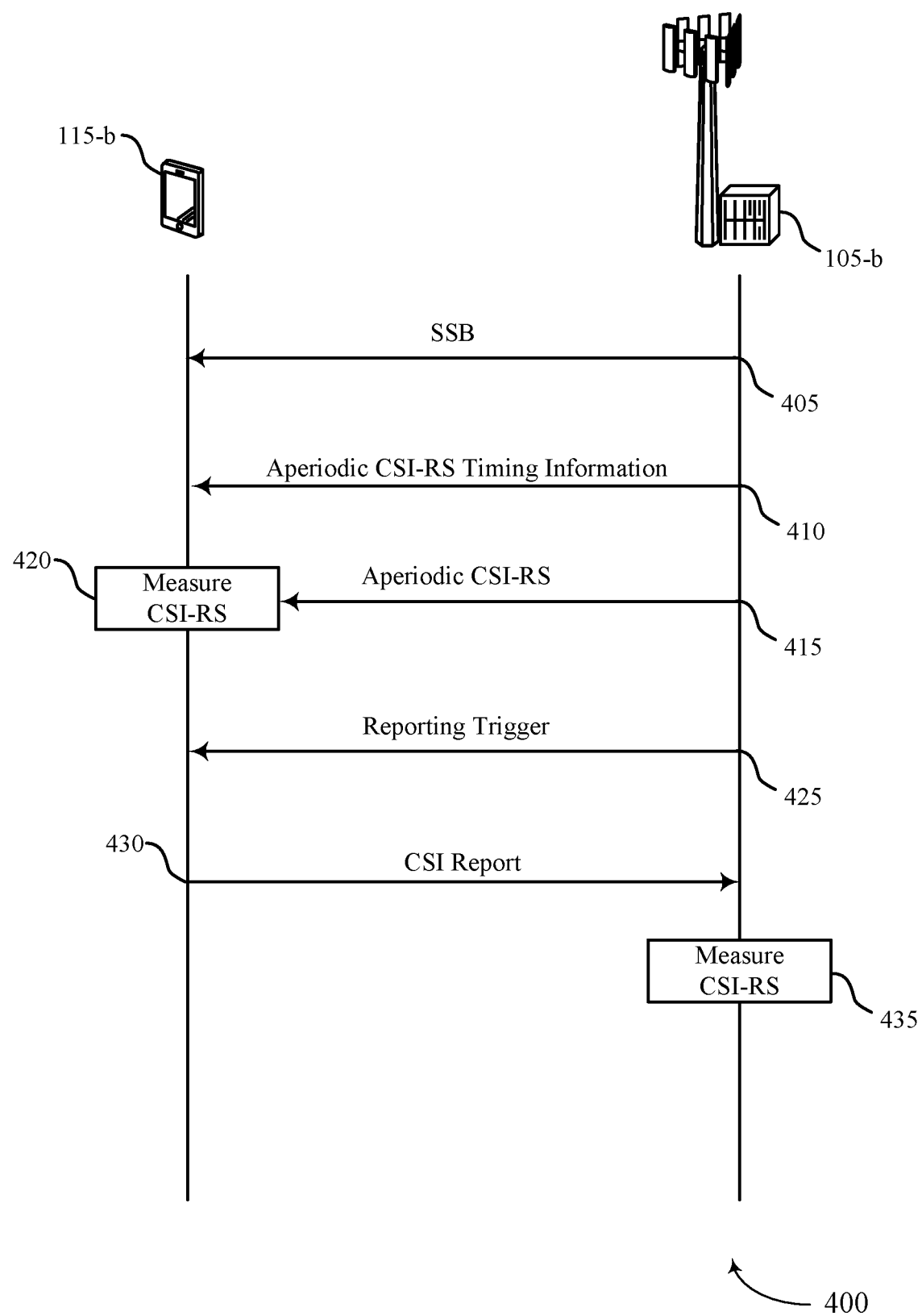
FIG. 4 illustrates an example of a process flow that supports channel state information reference signal multiplexing with synchronization signal blocks in accordance with aspects of the present disclosure.

FIG. 4 illustrates an example of a process flow 400 that supports channel state information reference signal multiplexing with synchronization signal blocks in accordance with aspects of the present disclosure. In some examples, process flow 400 may implement aspects of wireless communication system 100. The process flow 400 includes UE 115-b and base station 105-b, which may be respective examples of a UE 115 and a base station 105. UE 115-b and base station 105-b may communicate in a wireless communications system that support unlicensed or shared communications.

Base station 105-b may perform an LBT procedure to gain access to a wireless channel of an unlicensed radio frequency spectrum band. At 405, base station 105-b may transmit an SSB. In some cases, base station 105-b may transmit a set of SSBs in different directions using beamformed transmissions. In some cases, a UE 115 may receive an SSB and establish a connection with base station 105-b based on system information and synchronization signals transmitted in the SSB.

At 410, base station 105-b may transmit an indication of an aperiodic timing occasion for transmission of a CSI-RS over the wireless channel of the unlicensed radio frequency spectrum band during a slot that carries an SSB. The CSI-RS may be an example of an aperiodic CSI-RS as described herein. In some cases, the slot that carries the SSB may be an example of a DRS slot as described herein. In some cases, the indication may be a CSI triggering DCI. In some cases, UE 115-b may not immediately transmit a measurement report for an aperiodic CSI-RS that is multiplexed with an SSB. For example, the aperiodic CSI-RS may be transmitted to occupy the shared wireless channel such that another wireless device does not gain control of the shared wireless channel.

In an example, the indication may be an uplink grant that does not have an associated uplink resource. The uplink grant may trigger the aperiodic CSI-RS, but UE 115-b may not transmit a measurement report for the aperiodic CSI-RS, as there may not be an uplink resource (e.g., for UE 115-b to transmit the report). In another examples, the indication may be a downlink grant with a CSI-RS trigger. For example, DCI carrying the downlink grant may include a CSI request field. In some cases, the indication (e.g., the uplink grant or the downlink grant) may be directed to, or transmitted to, a group of monitoring UEs. In some cases, the indication may be transmitted with a group common RNTI (GC-RNTI). In some cases, the group of UEs may be UEs 115 connected to base station 105-b, idle UEs 115, UEs 115 listening to SI-RNTI, or UEs 115 listening to a physical RNTI. For example, base station 105-b may trigger aperiodic CSI-RS measurement at any one or more groups of UEs 115 listening to the GC-RNTI, SI-RNTI, etc.

At 415, base station 105-b may transmit the CSI-RS during the timing occasion. In some cases, the CSI-RS may be QCLed with the SSB transmitted at 405. In some cases, base station 105-b may have included a QCL configuration for the CSI-RS with the timing information transmitted at 410. At 420, UE 115-b may measure the CSI-RS. For example, UE 115-b may generate a CSI measurement report based on the CSI-RS.

In some cases, the indication transmitted at 410 may not include an uplink resource for a CSI measurement report. For example, the indication may be an uplink grant to trigger aperiodic CSI-RS without an associated uplink resource for a CSI report. Or, in some cases, the indication may be a downlink grant that includes an aperiodic CSI-RS trigger. Generally, UE 115-b may not immediately transmit a measurement report for the aperiodic CSI-RS measured at 420. Instead, base station 105-b may transmit a separate report trigger to UE 115-b at 425.

At 425, UE 115-b may detect a separate CSI report trigger to transmit a measurement report for the CSI-RS. In some cases, base station 105-b may transmit a CSI triggering DCI, which may be an example of the CSI report trigger. The CSI report trigger may, in some cases, indicate to report a previously measured CSI, or the CSI report trigger may indicate to measure an additional CSI-RS and report for the additional CSI-RS. At 430, UE 115-b may transmit the measurement report to base station 105-b on the wireless channel based on the CSI report trigger.

At 435, base station 105-b may, in some cases, manage the wireless channel based on the CSI report. For example, base station 105-b may manage cell loading, update any beamforming configurations, mobility configurations for UE 115-b, etc. based on receiving the CSI report.

Figure 5:
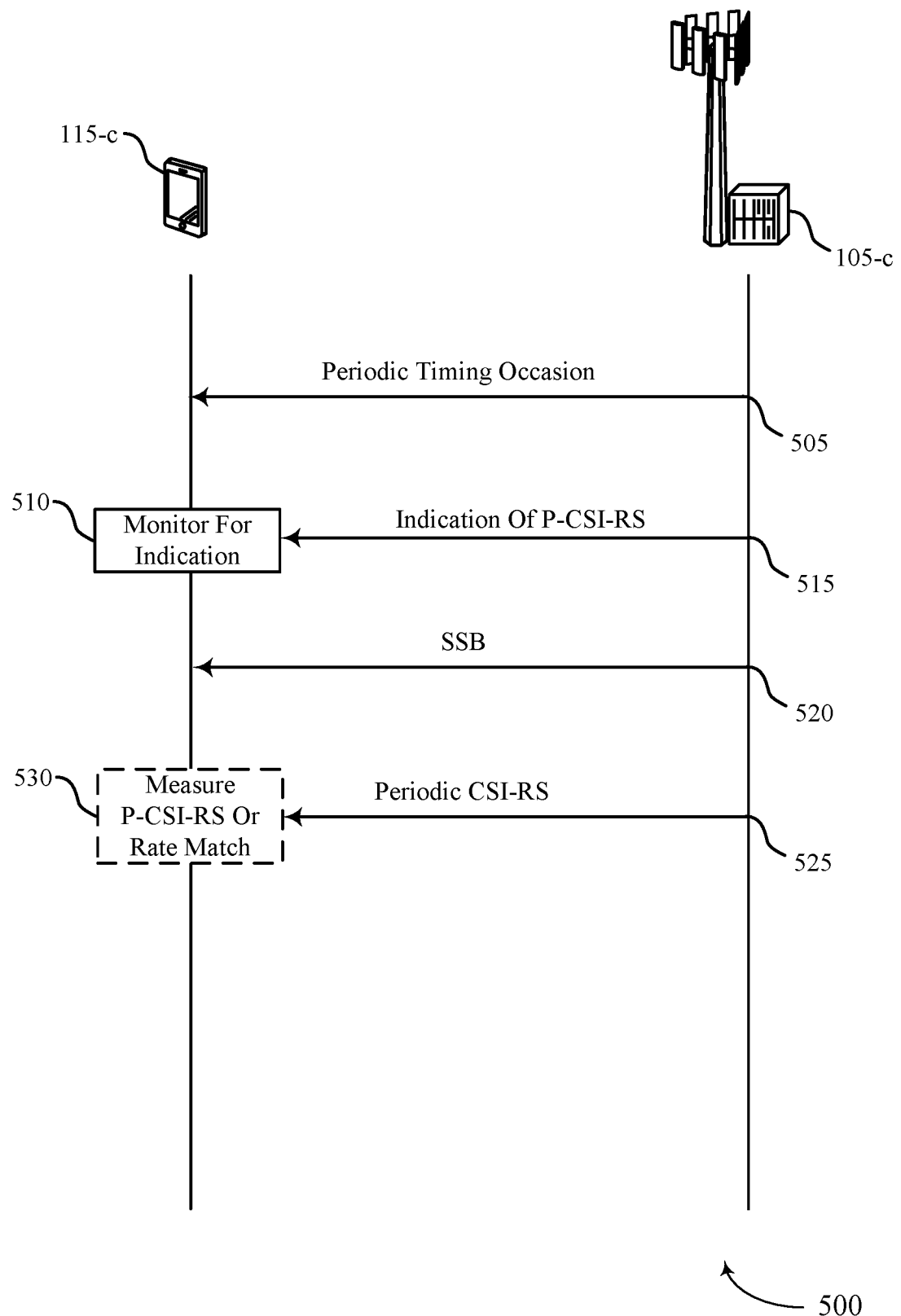
FIG. 5 illustrates an example of a process flow that supports channel state information reference signal multiplexing with synchronization signal blocks in accordance with aspects of the present disclosure.

FIG. 5 illustrates an example of a process flow 500 that supports channel state information reference signal multiplexing with synchronization signal blocks in accordance with aspects of the present disclosure. In some examples, process flow 500 may implement aspects of wireless communication system 100. The process flow 500 includes UE 115-c and base station 105-c, which may be respective examples of a UE 115 and a base station 105. UE 115-c and base station 105-c may communicate in a wireless communications system that support unlicensed or shared communications.

Base station 105-c may perform an LBT procedure to gain access to a wireless channel of an unlicensed radio frequency spectrum band. Base station 105-c may support multiplexing a CSI-RS with an SSB in a DRS slot. In some cases, base station 105-c may multiplex a periodic CSI-RS with SSBs. Therefore, to indicate a window for when the periodic CSI-RS may occur, base station 105-c may indicate a configuration for the periodic CSI-RS to UE 115-a. At 505, UE 115-c may receive, from base station 105-c, an indication of a periodic timing occasion for transmission of a CSI-RS over a wireless channel of an unlicensed shared radio frequency spectrum band during a slot associated with an SSB.

In some cases, UE 115-c may identify a transmission opportunity window for the CSI-RS. Generally, periodic signaling, such as a periodic CSI-RS, may be present at a fixed periodicity. However, for multiplexing with DRS, the periodic CSI-RS may instead be transmitted when DRS is transmitted and not otherwise. Therefore, base station 105-c may configure UE 115-c with a window. The periodic CSI-RS may be associated with the window, and the periodic CSI-RS may not be present outside of the window. In some cases, the transmission opportunity window may be associated with a DMTC. In some cases, the window may be very large (e.g., infinite), and base station 105-c may indicate the presence of the periodic CSI-RS within the window by transmitting a trigger to UE 115-c.

In some cases, UE 115-c may receive a configuration of multiple periodic CSI-RS configurations with an offset falling in the transmission opportunity window. In some cases, UE 115-c may receive a configuration of a single CSI-RS with multiple offsets falling inside the transmission opportunity window.

At 510 UE 115-c may monitor for an indication that the CSI-RS is enabled. If base station 105-c gains access to the wireless channel for a DRS, base station 105-c may transmit an indication of the presence of the periodic CSI-RS at 515. In some cases, the indication may be a COT-SI message. If the indication is a COT-SI message, the COT-SI message may include some fields (e.g., DCI Format 1_0 fields) used for DRS transmission. For example, the COT-SI may be used to grant PDSCH for RMSI and may include indicators for MCS, frequency and time domain resources, and an SI indicator. In some cases, the indication may be transmitted in downlink control information. For example, the indication may be a downlink grant with a CSI trigger. In some examples, DCI scrambled with a SI-RNTI may be used as an indication of the presence of the periodic CSI-RS. In some cases, base station 105-c may transmit an SFI with a specific value to indicate the presence of periodic CSI-RS. For example, within the window, an SFI indicating all downlink slots may be used to indicate that periodic CSI-RS is enabled and present within the window.

Based on the indication of the presence of the periodic CSI-RS, UE 115-c may measure the periodic CSI-RS, rate match around the periodic CSI-RS, or both. For example, base station 105-c may gain access to the wireless channel, transmit the indication of the presence of the periodic CSI-RS at 515, and transmit the periodic CSI-RS at 525. In some cases, at 530, UE 115-c may measure the periodic CSI-RS. UE 115-c may generate a CSI report based on measuring the periodic CSI-RS. In some cases, UE 115-c may transmit a CSI report, or UE 115-c may be triggered to report the CSI measurement at a later time.

In some examples, UE 115-c may identify the presence of periodic CSI-RS and rate match around the periodic CSI-RS. In some cases, unicast PDSCH messages may be transmitted in the same resource to UE 115-c, and UE 115-c may rate match around the periodic CSI-RS to receive the unicast PDSCH messages. In some examples, UE 115-c may rate match an RMSI transmission around the CSI-RS. In some cases, the CSI-RS may be a non-zero power CSI-RS or a zero power CSI-RS. In some cases, performing the rate matching around the periodic CSI-RS may be based on UE 115-c detecting the indication transmitted at 515.

In some cases, UE 115-c may identify a QCL assumption for receiving the periodic CSI-RS. In the DRS slot, base station 105-a may transmit one or more SSBs, such as at 520. In some examples, UE 115-c may identify a QCL relationship for receiving the CSI-RS based on the SSB. For example, UE 115-c may identify a QCL relationship for receiving the CSI-RS based on the CSI-RS being multiplexed with an SSB symbol of the SSB, for example as described with reference to the CSI-RS and SSB multiplexing configuration 300. In some cases, UE 115-c may identify the QCL relationship for receiving the CSI-RS based on the CSI-RS overlapping with a half-slot including the SSB. In some cases, UE 115-c may identify the QCL relationship for receiving the CSI-RS based on the SSB immediately succeeding the CSI-RS, for example as described with reference to CSI-RS and SSB multiplexing configuration 301. In some cases, UE 115-c may identify the QCL relationship for receiving the CSI-RS based on proximity of the CSI-RS to an SSB symbol, for example as described with reference to CSI-RS and SSB multiplexing configuration 302. Additionally, or alternatively, base station 105-c may transmit an indication of a QCL parameter (e.g., with the indication at 515), and UE 115-c may apply a QCL assumption based on the QCL parameter.

In some cases, UE 115-c may monitor for the periodic CSI-RS from a first base station 105 and transmit a measurement report for the periodic CSI-RS at a second, different base station 105. For example, base station 105-c may configure UE 115-c for the periodic CSI-RS, or base station 105-c may indicate the periodic timing occasion for the CSI-RS to UE 115-c, or both. UE 115-c may measure the periodic CSI-RS, generate a CSI measurement report, and transmit the CSI measurement report to a different base station 105. In some cases, base station 105-c may configure UE 115-c with the timing occasion for the CSI-RS, and UE 115-c may measure the CSI-RS from a different base station 105.

Figure 6:
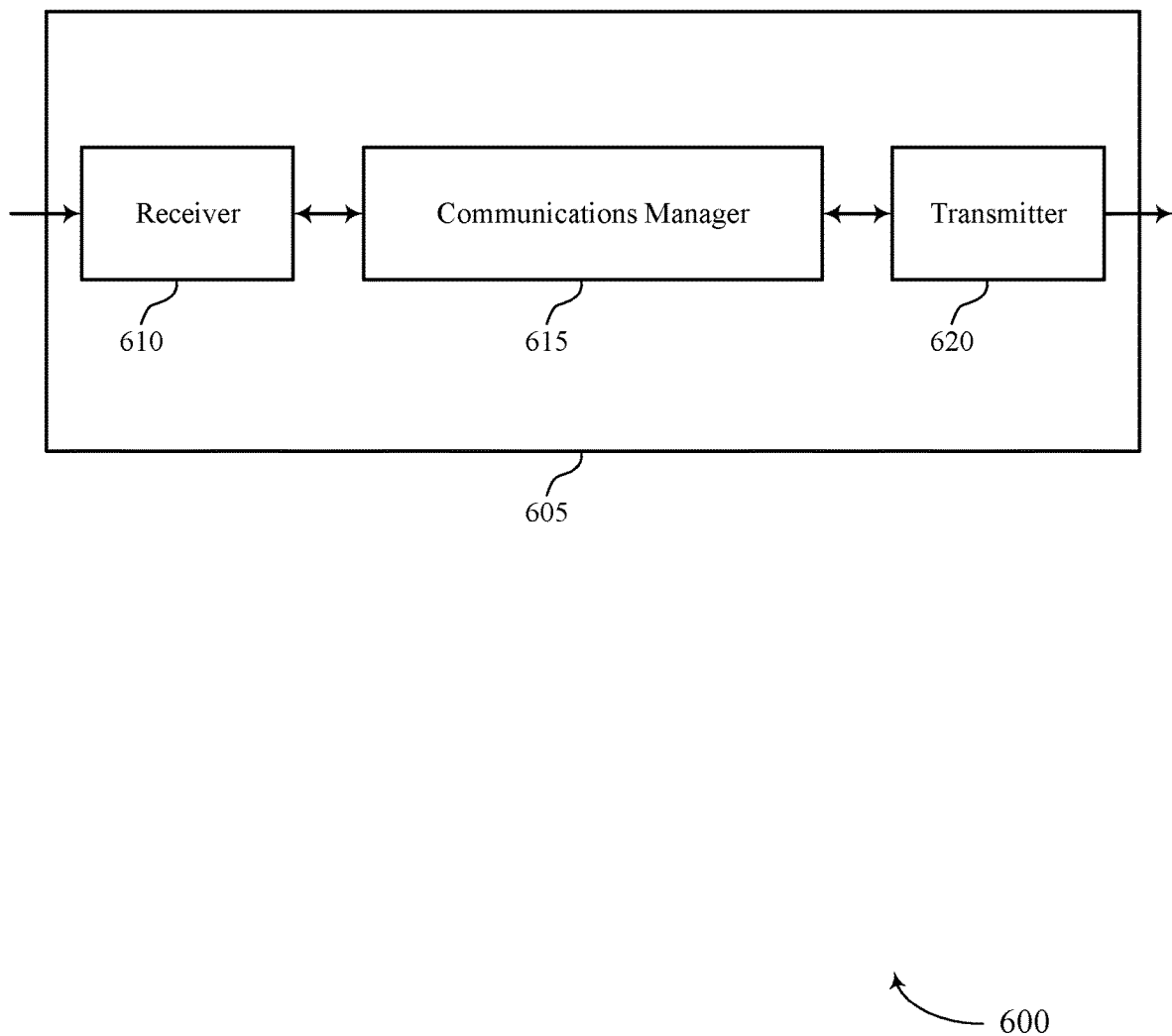
FIGS. 6 and 7 show block diagrams of devices that support channel state information reference signal multiplexing with synchronization signal blocks in accordance with aspects of the present disclosure.

FIG. 6 shows a block diagram 600 of a device 605 that supports channel state information reference signal multiplexing with synchronization signal blocks in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to channel state information reference signal multiplexing with synchronization signal blocks, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may receive, from a base station, an indication of an aperiodic timing occasion for transmission of a channel state information reference signal over a wireless channel of an unlicensed radio frequency spectrum band, measure the channel state information reference signal during the timing occasion based on the indication, detect a channel state information report trigger to transmit a measurement report for the channel state information reference signal, where the channel state information report trigger is separate from the indication of the aperiodic timing occasion, and transmit the measurement report to the base station on the wireless channel based on the channel state information report trigger.

The communications manager 615 may also receive, from a base station, an indication of a periodic timing occasion for transmission of a channel state information reference signal over a wireless channel of an unlicensed radio frequency spectrum band during a slot associated with a synchronization signal block and monitor for an indication that the channel state information reference signal is enabled. The communications manager 615 may be an example of aspects of the communications manager 910 described herein.

The communications manager 615 may also receive, from a base station, an indication of a timing occasion for transmission of a channel state information reference signal over a wireless channel of an unlicensed radio frequency spectrum band during a slot that carries a synchronization signal block, identify that the channel state information reference signal is quasi co-located with the synchronization signal block, measure the channel state information reference signal during the timing occasion based on the channel state information reference signal being quasi co-located with the synchronization signal block, detect a channel state information report trigger to transmit a measurement report for the channel state information reference signal, and transmit the measurement report to the base station on the wireless channel based on the channel state information report trigger.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The actions performed by the communications manager 615 as described herein may be implemented to realize one or more potential advantages. One implementation may allow a base station 105 maintain control of a wireless channel in a shared radio frequency spectrum band by multiplexing CSI-RS with SSBs a DRS slot. This may enable the base station 105 to complete transmission of SSBs in the DRS slot. A UE 115 in idle or disconnected mode may be ready to establish a connection with the base station 105, and this may improve the likelihood of the UE 115 receiving an SSB during the DRS slot and connecting to the base station 105. UEs 115 which are connected to the base station 105 may experience some advantages as well, as the connected UE 115 may have improved techniques for CSI reporting. For example, a connected UE 115 may have additional opportunities or CSI reporting, which may be used to improved channel conditions for the UE 115.

By receiving a group proximity message from a UE 115, a base station 105 may perform efficient signaling by indicating beamforming configurations for the group of UEs 115 instead of indicating beamforming configurations for each of the UEs 115 individually. For example, the UEs 115 may be in close enough proximity that the base station 105 can frequency division multiplex the UEs 115 on a same beam. Then, the base station 105 may perform just one beam update and, in some cases, transmit beam update information for a single UE 115. Additionally, the base station 105 may configure a subset of UEs 115 in the group, in some cases a single UE 115, for beam measurement and reporting. This may provide the same granularity of measurement information, or approximately the same, with significantly less overhead for signaling.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
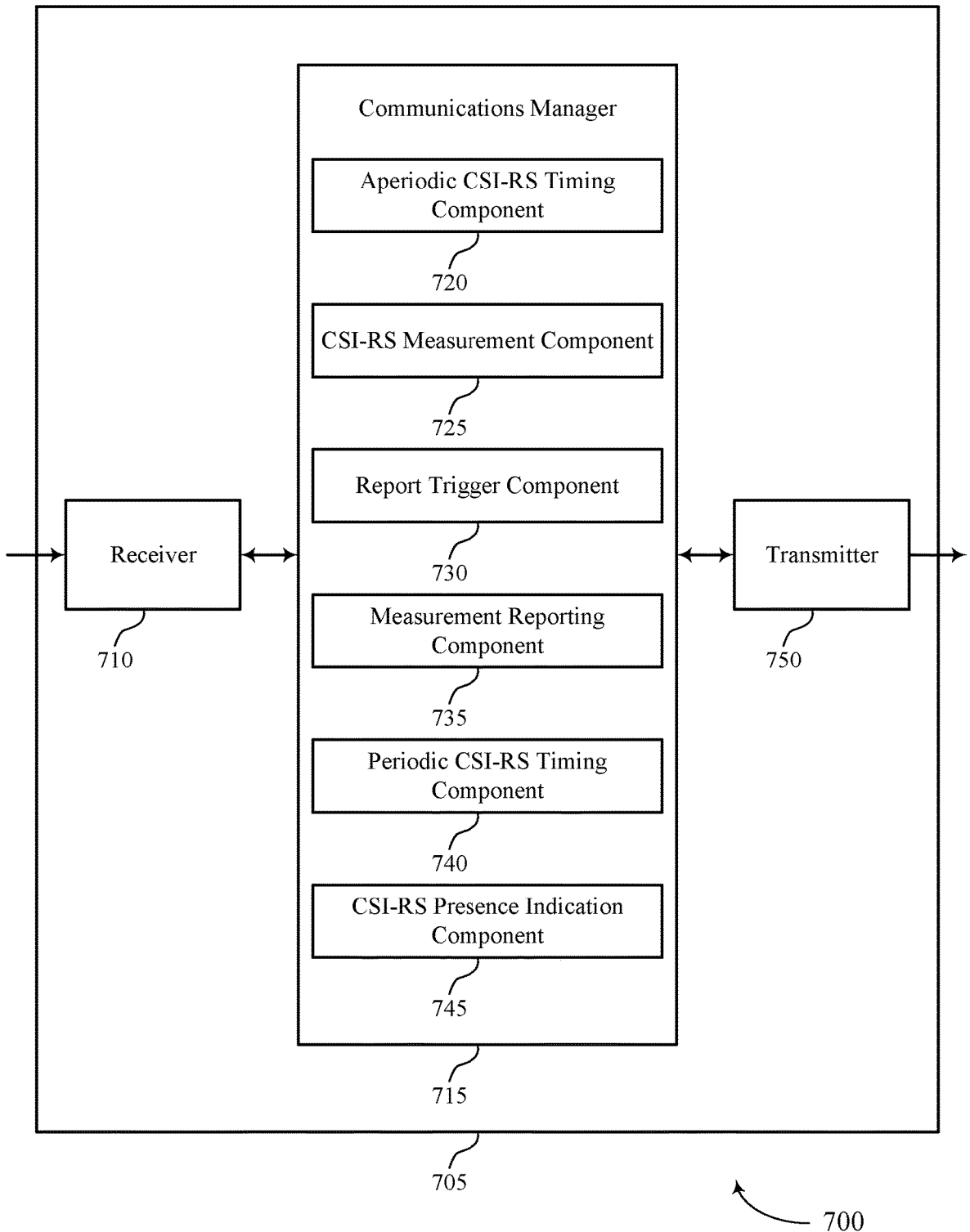

FIG. 7 shows a block diagram 700 of a device 705 that supports channel state information reference signal multiplexing with synchronization signal blocks in accordance with aspects of the present disclosure. The device 705 may be an example of aspects of a device 605, or a UE 115 as described herein. The device 705 may include a receiver 710, a communications manager 715, and a transmitter 750. The device 705 may also include a processor. Each of these components may be in communication with one another (e.g., via one or more buses).

The receiver 710 may receive information such as packets, user data, or control information associated with various information channels (e.g., control channels, data channels, and information related to channel state information reference signal multiplexing with synchronization signal blocks, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include an aperiodic CSI-RS timing component 720, a CSI-RS measurement component 725, a report trigger component 730, a measurement reporting component 735, a periodic CSI-RS timing component 740, and a CSI-RS presence indication component 745. The communications manager 715 may be an example of aspects of the communications manager 910 described herein.

The aperiodic CSI-RS timing component 720 may receive, from a base station, an indication of an aperiodic timing occasion for transmission of a channel state information reference signal over a wireless channel of an unlicensed radio frequency spectrum band. The CSI-RS measurement component 725 may measure the channel state information reference signal during the timing occasion based on the indication. The report trigger component 730 may detect a channel state information report trigger to transmit a measurement report for the channel state information reference signal, where the channel state information report trigger is separate from the indication of the aperiodic timing occasion.

The measurement reporting component 735 may transmit the measurement report to the base station on the wireless channel based on the channel state information report trigger. The periodic CSI-RS timing component 740 may receive, from a base station, an indication of a periodic timing occasion for transmission of a channel state information reference signal over a wireless channel of an unlicensed radio frequency spectrum band during a slot associated with a synchronization signal block. The CSI-RS presence indication component 745 may monitor for an indication that the channel state information reference signal is enabled.

The transmitter 750 may transmit signals generated by other components of the device 705. In some examples, the transmitter 750 may be collocated with a receiver 710 in a transceiver module. For example, the transmitter 750 may be an example of aspects of the transceiver 920 described with reference to FIG. 9. The transmitter 750 may utilize a single antenna or a set of antennas.

Figure 8:
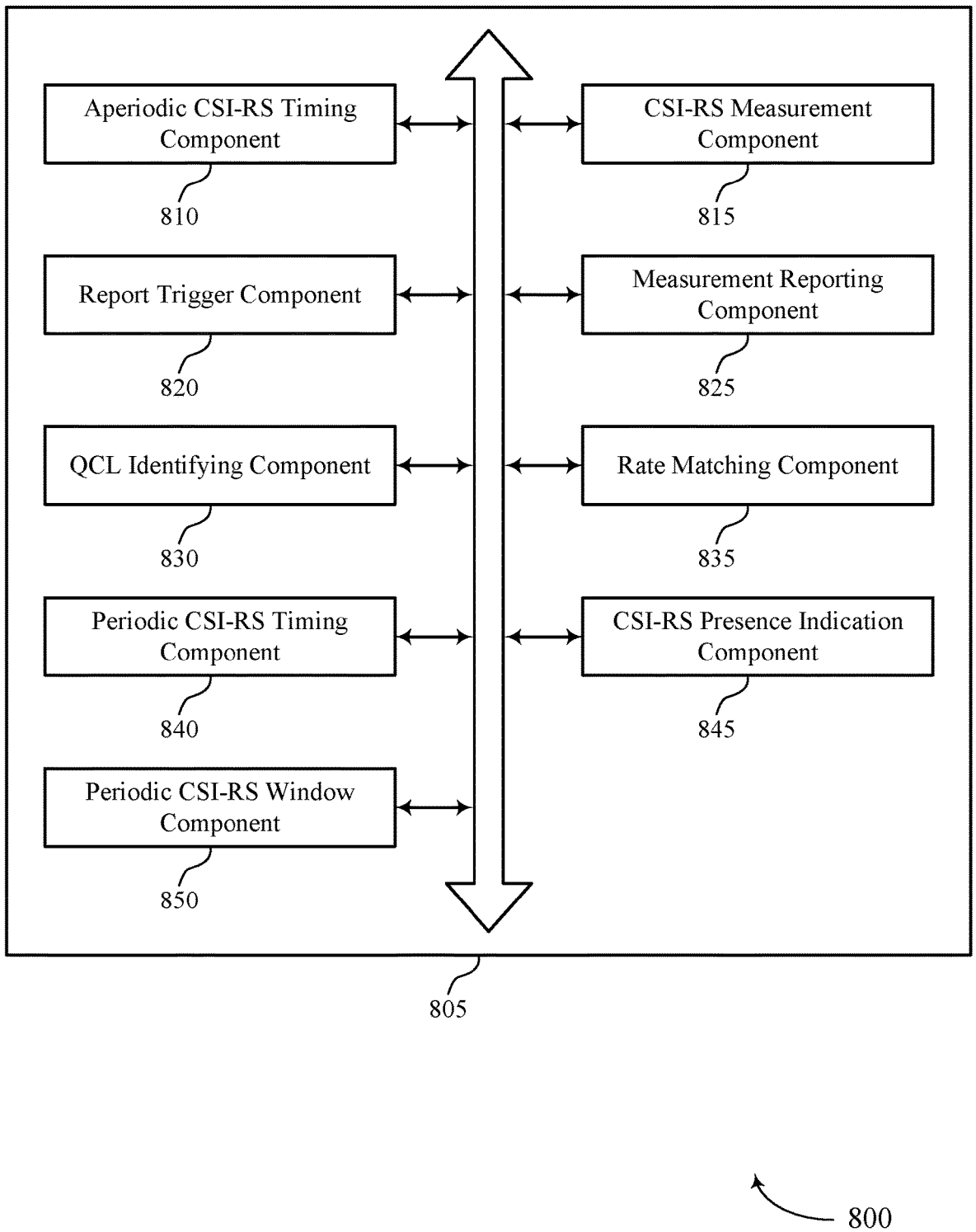
FIG. 8 shows a block diagram of a communications manager that supports channel state information reference signal multiplexing with synchronization signal blocks in accordance with aspects of the present disclosure.

FIG. 8 shows a block diagram 800 of a communications manager 805 that supports channel state information reference signal multiplexing with synchronization signal blocks in accordance with aspects of the present disclosure. The communications manager 805 may be an example of aspects of a communications manager 615, a communications manager 715, or a communications manager 910 described herein. The communications manager 805 may include an aperiodic CSI-RS timing component 810, a CSI-RS measurement component 815, a report trigger component 820, a measurement reporting component 825, a QCL identifying component 830, a rate matching component 835, a periodic CSI-RS timing component 840, a CSI-RS presence indication component 845, and a periodic CSI-RS window component 850. Each of these modules may communicate, directly or indirectly, with one another (e.g., via one or more buses).

The aperiodic CSI-RS timing component 810 may receive, from a base station, an indication of an aperiodic timing occasion for transmission of a channel state information reference signal over a wireless channel of an unlicensed radio frequency spectrum band. In some examples, the aperiodic CSI-RS timing component 810 may receive downlink control information including a channel state information trigger. In some examples, the aperiodic CSI-RS timing component 810 may identify a channel state information configuration as part of a serving cell configuration associated with the base station, where the channel state information trigger is based on the channel state information configuration. In some cases, the downlink control information includes an uplink grant without an uplink channel resource for reporting the measurement report. In some examples, the aperiodic CSI-RS timing component 810 may receive downlink control information including a channel state information trigger, where the channel state information reference signal is an aperiodic channel state information reference signal.

In some cases, the uplink grant is directed to a group of monitoring UEs including the UE. In some cases, the group of monitoring UEs includes connected UEs, idle UEs, UEs configured to monitor for a system information radio network temporary identifier, UEs configured to monitor for a paging radio network temporary identifier, UEs configured to monitor for a group common identifier, or any combination thereof. In some cases, the downlink grant further grants resources for a common channel, where the common channel includes a remaining minimum system information downlink shared channel, a paging downlink shared channel, an other system information downlink shared channel, or a combination thereof.

In some cases, the downlink control information includes a timing offset parameter indicating that the channel state information report trigger is transmitted in a separate transmission after the indication of the aperiodic timing occasion. In some cases, the downlink control information includes a downlink grant with a channel state information request field. The CSI-RS measurement component 815 may measure the channel state information reference signal during the timing occasion based on the indication.

The report trigger component 820 may detect a channel state information report trigger to transmit a measurement report for the channel state information reference signal, where the channel state information report trigger is separate from the indication of the aperiodic timing occasion. In some examples, the report trigger component 820 may detect a trigger to transmit the measurement report for a latest received channel state information reference signal.

In some examples, the report trigger component 820 may receive an indication of a configuration for the channel state information reference signal via downlink control information or a physical broadcast channel message. In some cases, the downlink control information includes a channel state information report trigger.

The measurement reporting component 825 may transmit the measurement report to the base station on the wireless channel based on the channel state information report trigger.

The periodic CSI-RS timing component 840 may receive, from a base station, an indication of a periodic timing occasion for transmission of a channel state information reference signal over a wireless channel of an unlicensed radio frequency spectrum band during a slot associated with a synchronization signal block. In some examples, the periodic CSI-RS timing component 840 may receive a configuration for a set of individual periodic channel state information reference signal configurations with an offset corresponding to the transmission opportunity window. In some examples, the periodic CSI-RS timing component 840 may identify a configuration for the periodic timing occasion, where the periodic timing occasion occurs with a periodicity of 80 milliseconds or 160 milliseconds. In some examples, the configuration for the periodic timing occasion is indicated based on inclusion of the channel state information reference signal in a measurement object for a frequency. In some cases, the indication is a downlink grant in downlink control information associated with a system information radio network temporary identifier. The measurement object may be used, for example, for radio resource management. In some examples, the periodic CSI-RS timing component 840 may determine that transmission of the channel state information reference signal is enabled, where the channel state information reference signal is a periodic channel state information reference signal.

The CSI-RS presence indication component 845 may monitor for an indication that the channel state information reference signal is enabled. In some examples, the CSI-RS presence indication component 845 may receive the indication that the channel state information reference signal is enabled. In some cases, the indication is a channel occupancy time system information message. In some cases, the indication is a downlink grant including a channel state information trigger.

The QCL identifying component 830 may identify a quasi co-location relationship for receiving the channel state information reference signal based on one or more of the channel state information reference signal being multiplexed with a synchronization signal block, proximity of the channel state information reference signal to a synchronization signal block, the channel state information reference signal overlapping with a half-slot including the synchronization signal block, the synchronization signal block immediately succeeding the channel state information reference signal, or a quasi co-location parameter.

In some examples, the QCL identifying component 830 may receive an indication of a configuration for the channel state information reference signal via downlink control information or a physical broadcast channel message. In some examples, the QCL identifying component 830 may identify a quasi co-location relationship for receiving the channel state information reference signal based on one or more of the channel state information reference signal being multiplexed with a synchronization signal block, proximity of the channel state information reference signal to a synchronization signal block, the channel state information reference signal overlapping with a half-slot including the synchronization signal block, the synchronization signal block immediately succeeding the channel state information reference signal, or a quasi co-location parameter. In some examples, the QCL identifying component 830 may receive an additional synchronization signal block during the slot.

In some examples, the QCL identifying component 830 may receive an additional channel state information reference signal, where the additional channel state information reference signal is quasi co-located with the additional synchronization signal block. In some cases, the downlink control information includes the channel state information report trigger.

The rate matching component 835 may rate matching a remaining minimum system information transmission around the channel state information reference signal, where the channel state information reference signal is a non-zero power channel state information reference signal or a zero power channel state information reference signal. In some examples, the rate matching component 835 may rate matching a remaining minimum system information transmission around the channel state information reference signal, where the channel state information reference signal is a non-zero power channel state information reference signal or a zero power channel state information reference signal.

The periodic CSI-RS window component 850 may identify a transmission opportunity window for the periodic channel state information reference signal. In some examples, the periodic CSI-RS window component 850 may receive a slot format indicator, where the slot format indicator is the indication that the channel state information reference signal is enabled. In some examples, the periodic CSI-RS window component 850 may determine the channel state information reference signal is enabled within the transmission opportunity window based on the slot format indicator.

In some examples, the periodic CSI-RS window component 850 may receive downlink control information scrambled by a system information radio network temporary identifier, where the downlink control information is the indication that the channel state information reference signal is enabled. In some examples, the periodic CSI-RS window component 850 may determine the channel state information reference signal is enabled within the transmission opportunity window based on the downlink control information. In some examples, the periodic CSI-RS window component 850 may receive a configuration for a set of individual periodic channel state information reference signal configurations with an offset corresponding to the transmission opportunity window. In some examples, the periodic CSI-RS window component 850 may receive a configuration for a single periodic channel state information reference signal configuration with a set of offsets corresponding to the transmission opportunity window. In some cases, the transmission opportunity window is associated with a discovery reference signal measurement timing configuration.

Figure 9:
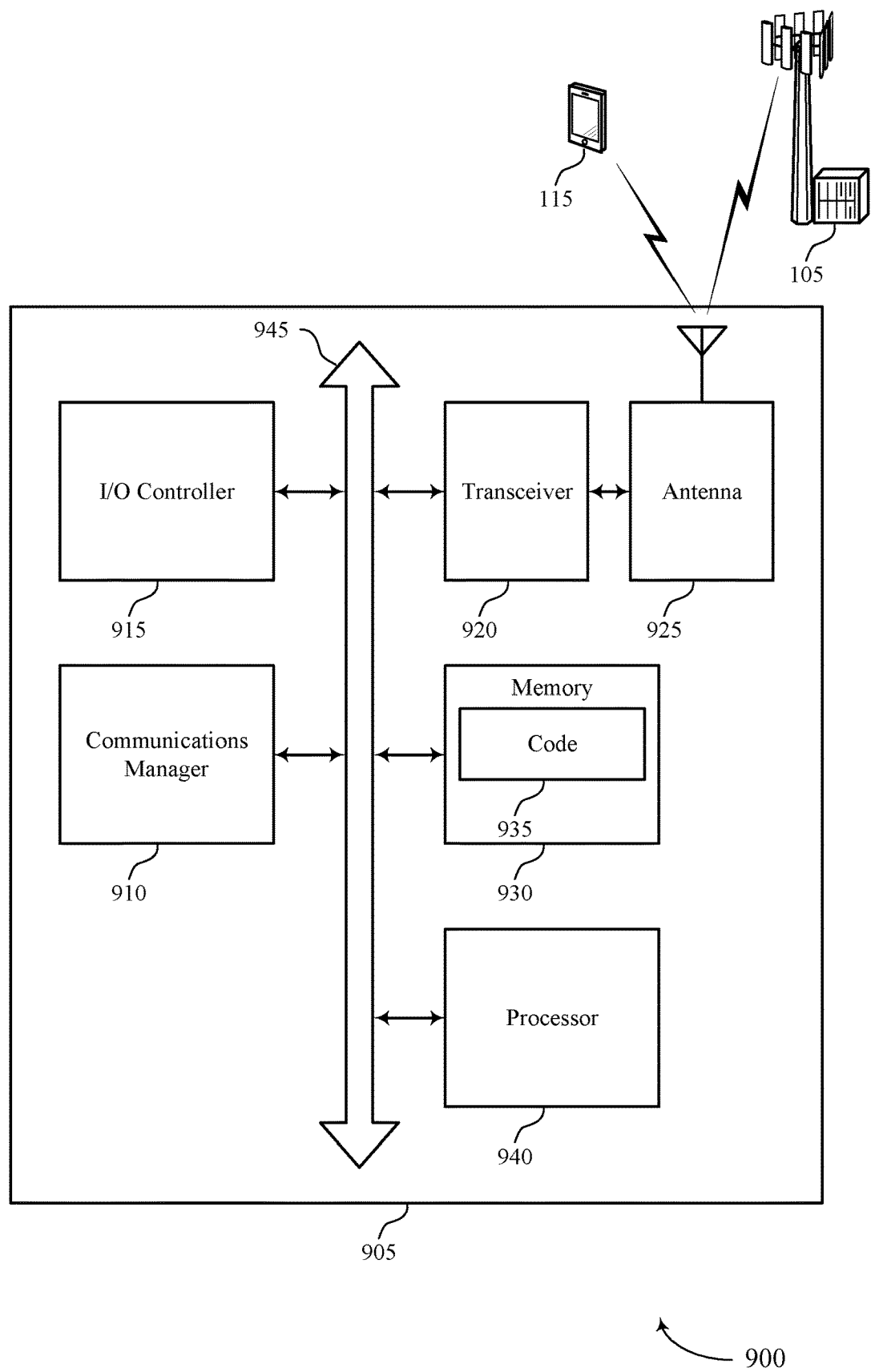
FIG. 9 shows a diagram of a system including a device that supports channel state information reference signal multiplexing with synchronization signal blocks in accordance with aspects of the present disclosure.

FIG. 9 shows a diagram of a system 900 including a device 905 that supports channel state information reference signal multiplexing with synchronization signal blocks in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may receive, from a base station, an indication of an aperiodic timing occasion for transmission of a channel state information reference signal over a wireless channel of an unlicensed radio frequency spectrum band, measure the channel state information reference signal during the timing occasion based on the indication, detect a channel state information report trigger to transmit a measurement report for the channel state information reference signal, where the channel state information report trigger is separate from the indication of the aperiodic timing occasion, and transmit the measurement report to the base station on the wireless channel based on the channel state information report trigger. The communications manager 910 may also receive, from a base station, an indication of a periodic timing occasion for transmission of a channel state information reference signal over a wireless channel of an unlicensed radio frequency spectrum band during a slot associated with a synchronization signal block and monitor for an indication that the channel state information reference signal is enabled.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM and ROM. The memory 930 may store computer-readable, computer-executable code 935 including instructions that, when executed, cause the processor to perform various functions described herein. In some cases, the memory 930 may contain, among other things, a basic input/output system (BIOS) which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting channel state information reference signal multiplexing with synchronization signal blocks).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
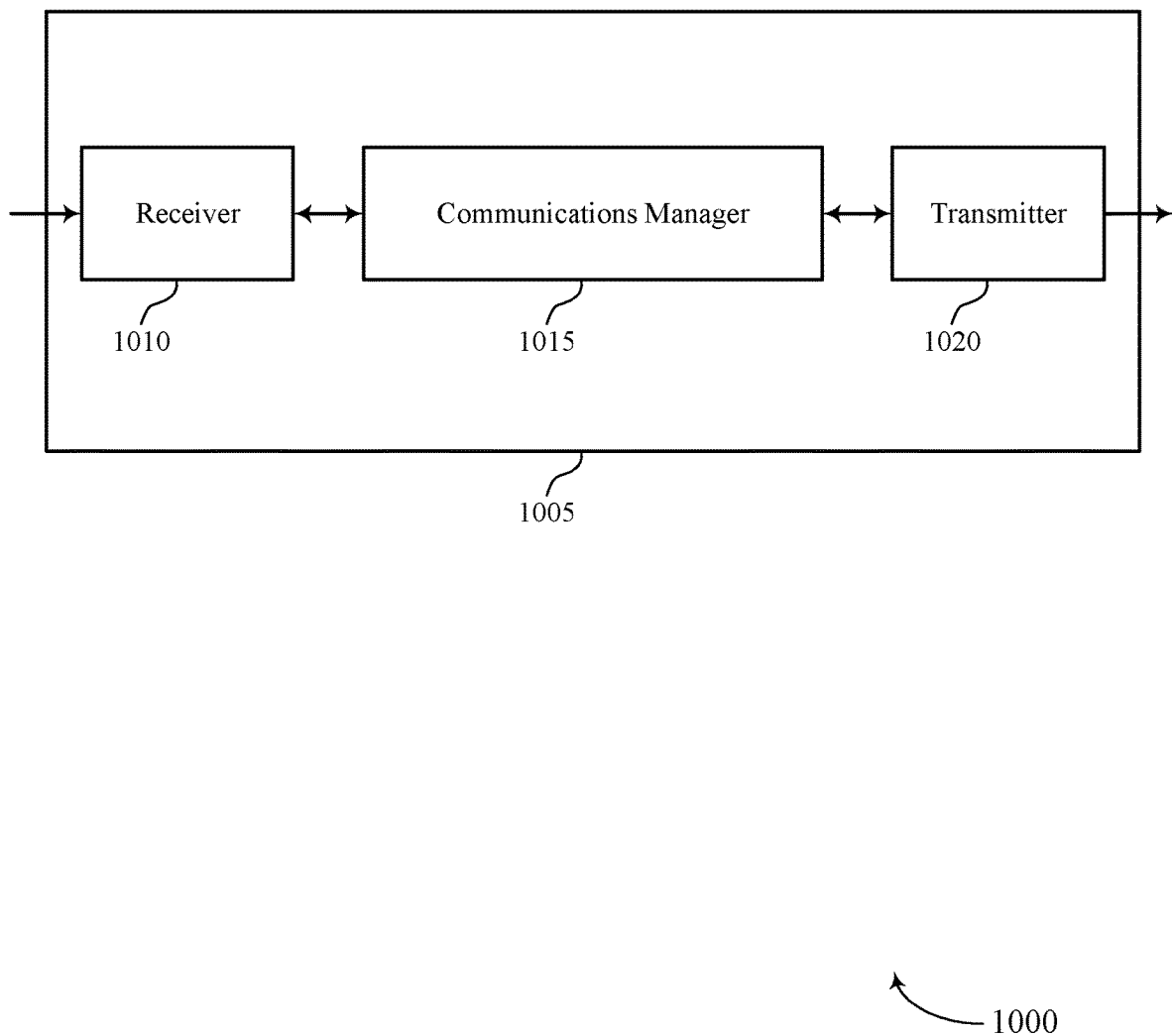
FIGS. 10 and 11 show block diagrams of devices that support channel state information reference signal multiplexing with synchronization signal blocks in accordance with aspects of the present disclosure.

FIG. 10 shows a block diagram 1000 of a device 1005 that supports channel state information reference signal multiplexing with synchronization signal blocks in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to channel state information reference signal multiplexing with synchronization signal blocks, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may transmit, to a UE, an indication of a timing occasion for transmission of a channel state information reference signal over a wireless channel of an unlicensed radio frequency spectrum band during a slot that carries a synchronization signal block, transmit the channel state information reference signal over the wireless channel, where the channel state information reference signal is multiplexed with the synchronization signal block in the slot, and transmit to the UE a channel state information report trigger. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
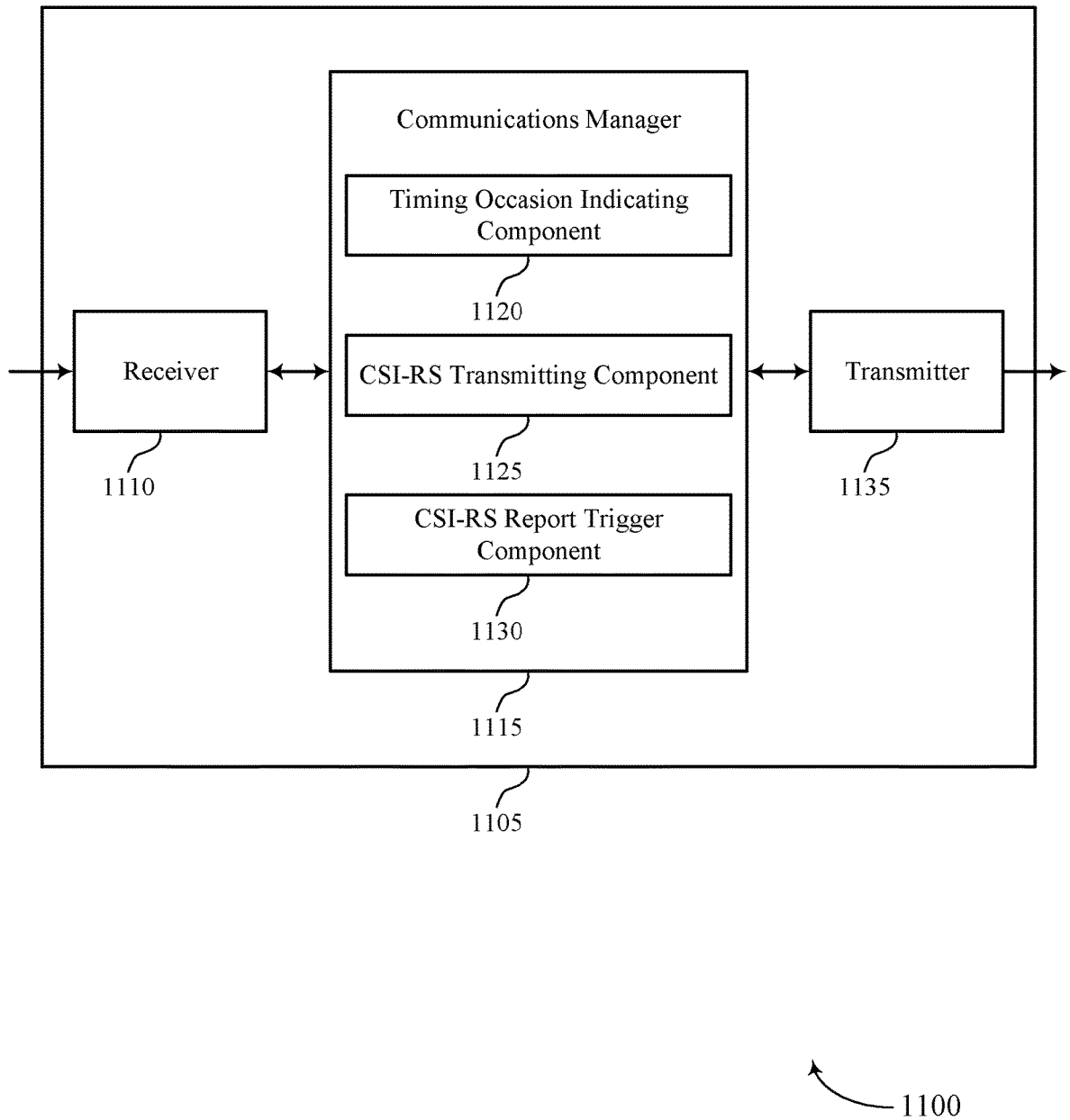

FIG. 11 shows a block diagram 1100 of a device 1105 that supports channel state information reference signal multiplexing with synchronization signal blocks in accordance with aspects of the present disclosure. The device 1105 may be an example of aspects of a device 1005, or a base station 105 as described herein. The device 1105 may include a receiver 1110, a communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to channel state information reference signal multiplexing with synchronization signal blocks, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a timing occasion indicating component 1120, a CSI-RS transmitting component 1125, and a CSI-RS report trigger component 1130. The communications manager 1115 may be an example of aspects of the communications manager 1310 described herein.

The timing occasion indicating component 1120 may transmit, to a UE, an indication of a timing occasion for transmission of a channel state information reference signal over a wireless channel of an unlicensed radio frequency spectrum band during a slot that carries a synchronization signal block. The CSI-RS transmitting component 1125 may transmit the channel state information reference signal over the wireless channel, where the channel state information reference signal is multiplexed with the synchronization signal block in the slot. The CSI-RS report trigger component 1130 may transmit to the UE a channel state information report trigger.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
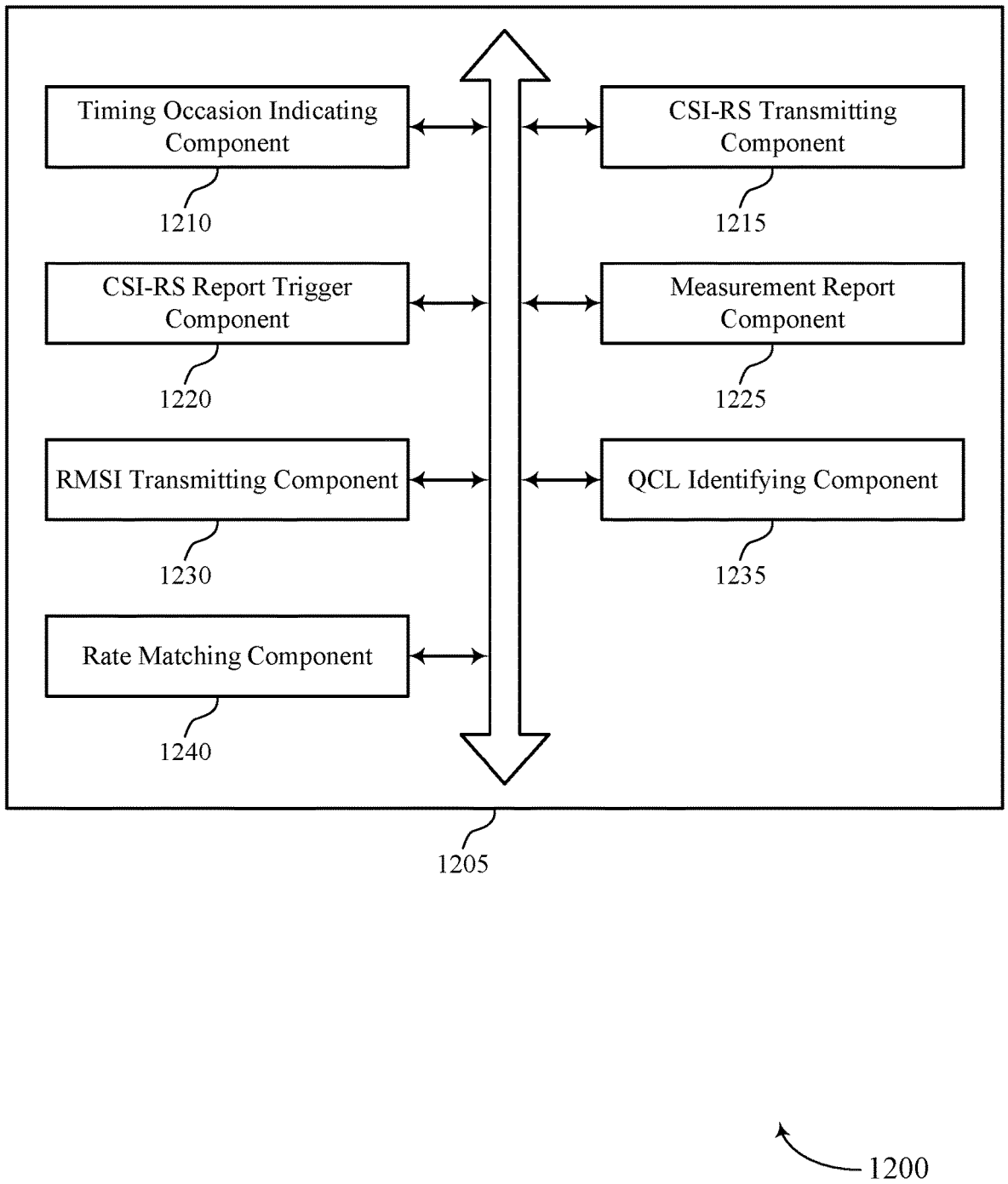
FIG. 12 shows a block diagram of a communications manager that supports channel state information reference signal multiplexing with synchronization signal blocks in accordance with aspects of the present disclosure.

FIG. 12 shows a block diagram 1200 of a communications manager 1205 that supports channel state information reference signal multiplexing with synchronization signal blocks in accordance with aspects of the present disclosure. The communications manager 1205 may be an example of aspects of a communications manager 1015, a communications manager 1115, or a communications manager 1310 described herein. The communications manager 1205 may include a timing occasion indicating component 1210, a CSI-RS transmitting component 1215, a CSI-RS report trigger component 1220, a measurement report component 1225, a RMSI transmitting component 1230, a QCL identifying component 1235, and a rate matching component 1240. Each of these modules may communicate, directly or indirectly, with one another (e.g., via one or more buses).

The timing occasion indicating component 1210 may transmit, to a UE, an indication of a timing occasion for transmission of a channel state information reference signal over a wireless channel of an unlicensed radio frequency spectrum band during a slot that carries a synchronization signal block. In some examples, the timing occasion indicating component 1210 may transmit downlink control information including a channel state information trigger to indicate the timing occasion, where the channel state information reference signal is an aperiodic channel state information reference signal. In some examples, the timing occasion indicating component 1210 may establish a channel state information configuration as part of a serving cell configuration associated with the base station, where the channel state information trigger is based on the channel state information configuration.

In some examples, the timing occasion indicating component 1210 may indicate that transmission of the channel state information reference signal is enabled, where the channel state information reference signal is a periodic channel state information reference signal. In some examples, the timing occasion indicating component 1210 may transmit a channel occupancy time system information message. In some examples, the timing occasion indicating component 1210 may transmit a downlink grant including a channel state information trigger. In some examples, the timing occasion indicating component 1210 may transmit a downlink grant in downlink control information associated with a system information radio network temporary identifier.

In some examples, the timing occasion indicating component 1210 may configure a transmission opportunity window for the periodic channel state information reference signal. In some examples, the timing occasion indicating component 1210 may transmit, separately, an offset for each periodic channel state information reference signal resource in the transmission opportunity window. In some examples, the timing occasion indicating component 1210 may transmit a slot format indicator to indicate a presence of the periodic channel state information reference signal in the transmission opportunity window.

In some examples, the timing occasion indicating component 1210 may transmit downlink control information to indicate a presence of the periodic channel state information reference signal in the transmission opportunity window. In some cases, the downlink control information includes an uplink grant without an uplink shared channel resource associated with the channel state information reference signal. In some cases, the downlink control information includes a parameter indicating that the channel state information reference signal report trigger is transmitted in a separate transmission after the indication of the timing occasion. In some cases, the downlink control information includes a downlink grant with a channel state information request field. In some cases, the transmission opportunity window is associated with a discovery reference signal measurement timing configuration.

The CSI-RS transmitting component 1215 may transmit the channel state information reference signal over the wireless channel, where the channel state information reference signal is multiplexed with the synchronization signal block in the slot. The CSI-RS report trigger component 1220 may transmit to the UE a channel state information report trigger.

In some examples, the CSI-RS report trigger component 1220 may trigger the UE to transmit the measurement report for a latest received channel state information reference signal. In some examples, the CSI-RS report trigger component 1220 may transmit an indication of a configuration for the channel state information reference signal via downlink control information or a physical broadcast channel message. In some cases, the downlink control information includes the channel state information report trigger.

The measurement report component 1225 may monitor the wireless channel for a measurement report from the UE based on the channel state information reference signal and the channel state information report trigger. The RMSI transmitting component 1230 may transmit remaining minimum system information on a downlink shared channel without rate matching around the channel state information reference signal.

The QCL identifying component 1235 may indicate a quasi co-location relationship for the channel state information reference signal based on one or more of the channel state information reference signal being multiplexed with a synchronization signal block, proximity of the channel state information reference signal to a synchronization signal block, the channel state information reference signal overlapping with a half-slot including the synchronization signal block, the synchronization signal block immediately succeeding the channel state information reference signal, or transmitting a quasi co-location parameter.

In some examples, the QCL identifying component 1235 may transmit an additional synchronization signal block during the slot. In some examples, the QCL identifying component 1235 may transmit an additional channel state information reference signal, where the additional channel state information reference signal is quasi co-located with the additional synchronization signal block. The rate matching component 1240 may rate matching a remaining minimum system information transmission around the channel state information reference signal, where the channel state information reference signal is a non-zero power channel state information reference signal or a zero power channel state information reference signal or a zero power channel state information reference signal or a zero power channel state information reference signal.

Figure 13:
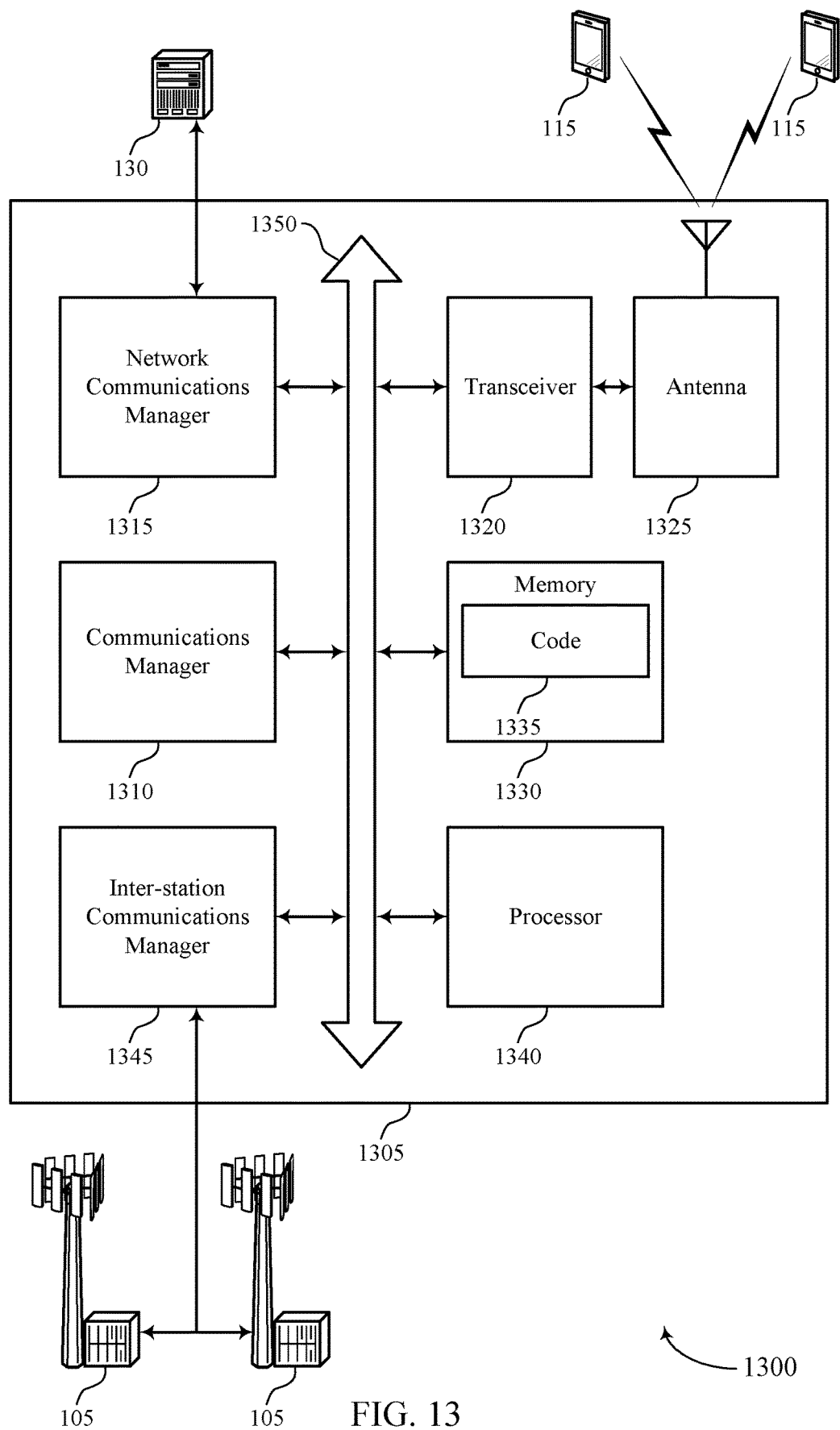
FIG. 13 shows a diagram of a system including a device that supports channel state information reference signal multiplexing with synchronization signal blocks in accordance with aspects of the present disclosure.

FIG. 13 shows a diagram of a system 1300 including a device 1305 that supports channel state information reference signal multiplexing with synchronization signal blocks in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may transmit, to a UE, an indication of a timing occasion for transmission of a channel state information reference signal over a wireless channel of an unlicensed radio frequency spectrum band during a slot that carries a synchronization signal block, transmit the channel state information reference signal over the wireless channel, where the channel state information reference signal is multiplexed with the synchronization signal block in the slot, and transmit to the UE a channel state information report trigger.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting channel state information reference signal multiplexing with synchronization signal blocks).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
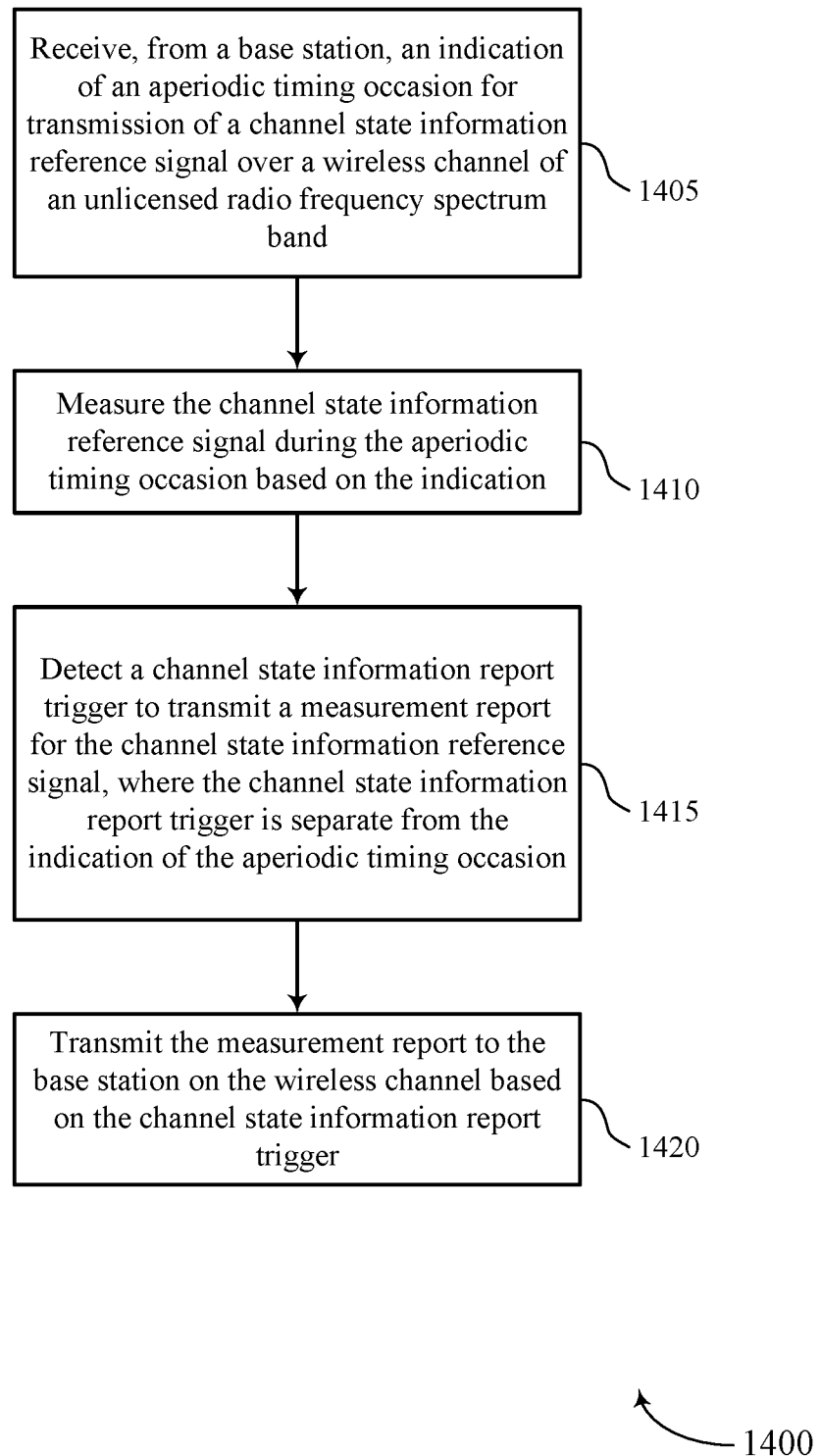
FIGS. 14 through 20 show flowcharts illustrating methods that support channel state information reference signal multiplexing with synchronization signal blocks in accordance with aspects of the present disclosure.

FIG. 14 shows a flowchart illustrating a method 1400 that supports channel state information reference signal multiplexing with synchronization signal blocks in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may receive, from a base station, an indication of an aperiodic timing occasion for transmission of a channel state information reference signal over a wireless channel of an unlicensed radio frequency spectrum band. The operations of 1405 may be performed according to the methods described herein. In some examples, aspects of the operations of 1405 may be performed by an aperiodic CSI-RS timing component as described with reference to FIGS. 6 through 9.

At 1410, the UE may measure the channel state information reference signal during the timing occasion based on the indication. The operations of 1410 may be performed according to the methods described herein. In some examples, aspects of the operations of 1410 may be performed by a CSI-RS measurement component as described with reference to FIGS. 6 through 9.

At 1415, the UE may detect a channel state information report trigger to transmit a measurement report for the channel state information reference signal, where the channel state information report trigger is separate from the indication of the aperiodic timing occasion. The operations of 1415 may be performed according to the methods described herein. In some examples, aspects of the operations of 1415 may be performed by a report trigger component as described with reference to FIGS. 6 through 9.

At 1420, the UE may transmit the measurement report to the base station on the wireless channel based on the channel state information report trigger. The operations of 1420 may be performed according to the methods described herein. In some examples, aspects of the operations of 1420 may be performed by a measurement reporting component as described with reference to FIGS. 6 through 9.

Figure 15:
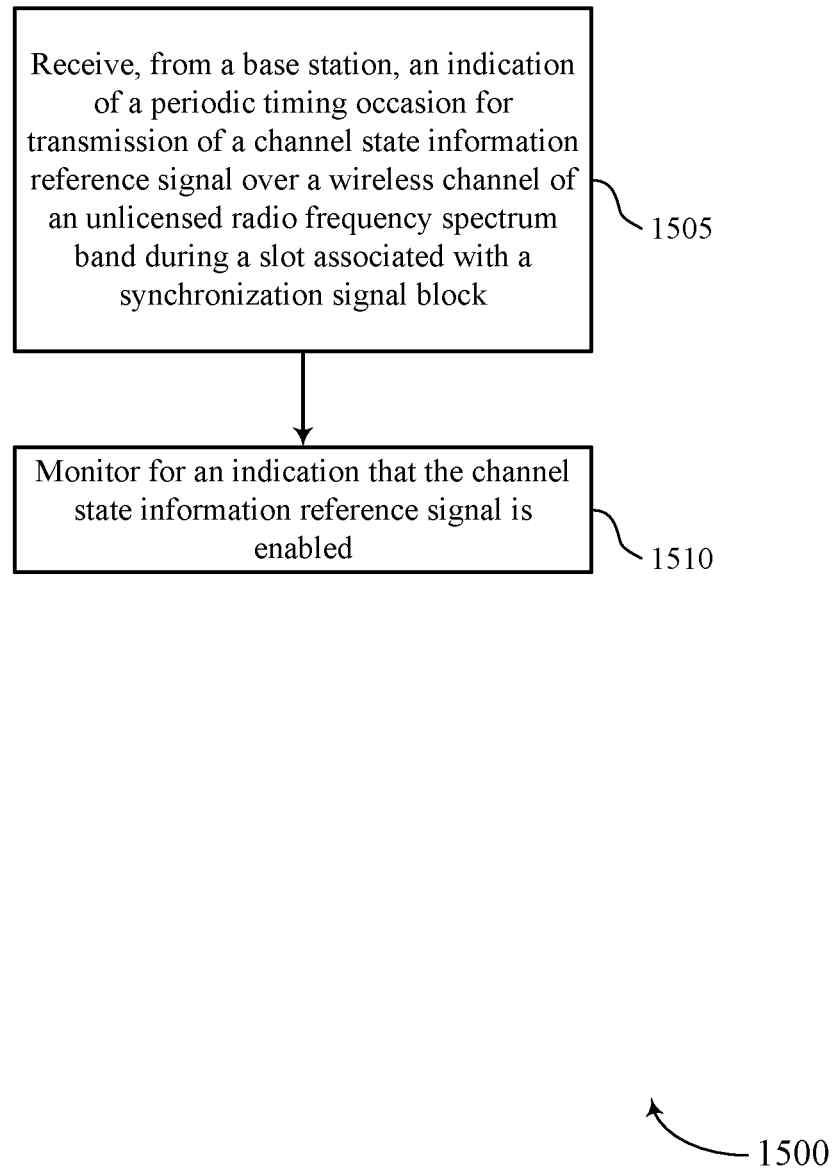

FIG. 15 shows a flowchart illustrating a method 1500 that supports channel state information reference signal multiplexing with synchronization signal blocks in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may receive, from a base station, an indication of a periodic timing occasion for transmission of a channel state information reference signal over a wireless channel of an unlicensed radio frequency spectrum band during a slot associated with a synchronization signal block. The operations of 1505 may be performed according to the methods described herein. In some examples, aspects of the operations of 1505 may be performed by a periodic CSI-RS timing component as described with reference to FIGS. 6 through 9.

At 1510, the UE may monitor for an indication that the channel state information reference signal is enabled. The operations of 1510 may be performed according to the methods described herein. In some examples, aspects of the operations of 1510 may be performed by a CSI-RS presence indication component as described with reference to FIGS. 6 through 9.

Figure 16:
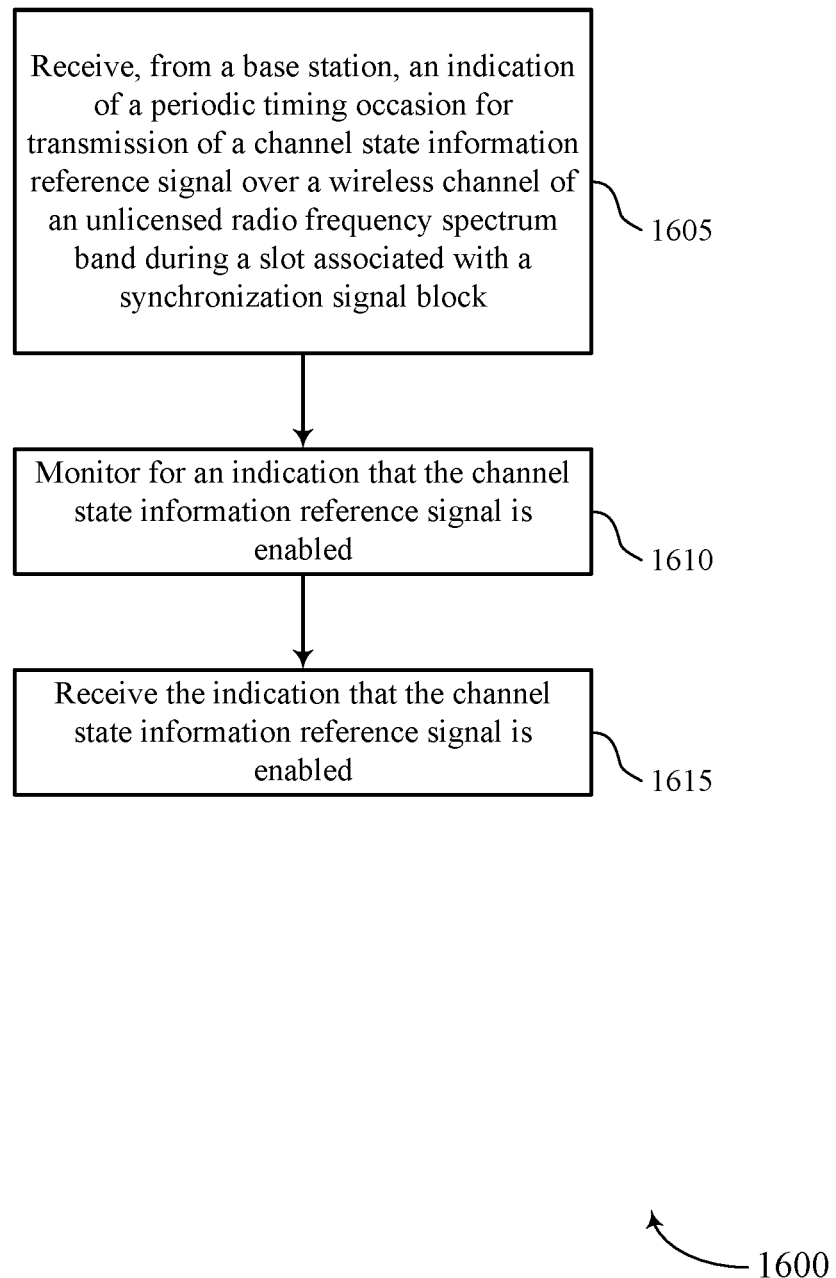

FIG. 16 shows a flowchart illustrating a method 1600 that supports channel state information reference signal multiplexing with synchronization signal blocks in accordance with aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1605, the UE may receive, from a base station, an indication of a periodic timing occasion for transmission of a channel state information reference signal over a wireless channel of an unlicensed radio frequency spectrum band during a slot associated with a synchronization signal block. The operations of 1605 may be performed according to the methods described herein. In some examples, aspects of the operations of 1605 may be performed by a periodic CSI-RS timing component as described with reference to FIGS. 6 through 9.

At 1610, the UE may monitor for an indication that the channel state information reference signal is enabled. The operations of 1610 may be performed according to the methods described herein. In some examples, aspects of the operations of 1610 may be performed by a CSI-RS presence indication component as described with reference to FIGS. 6 through 9.

At 1615, the UE may receive the indication that the channel state information reference signal is enabled. The operations of 1615 may be performed according to the methods described herein. In some examples, aspects of the operations of 1615 may be performed by a CSI-RS presence indication component as described with reference to FIGS. 6 through 9.

Figure 17:
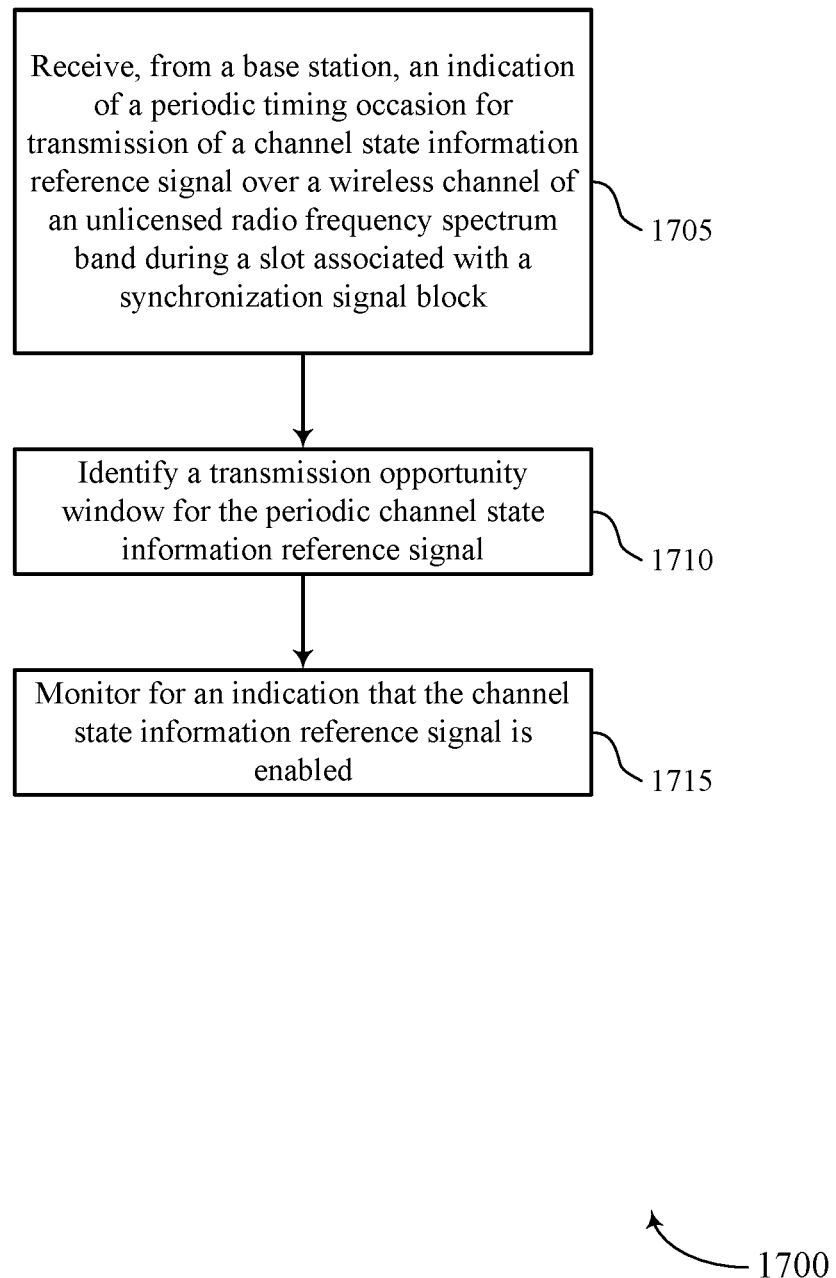

FIG. 17 shows a flowchart illustrating a method 1700 that supports channel state information reference signal multiplexing with synchronization signal blocks in accordance with aspects of the present disclosure. The operations of method 1700 may be implemented by a UE 115 or its components as described herein. For example, the operations of method 1700 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1705, the UE may receive, from a base station, an indication of a periodic timing occasion for transmission of a channel state information reference signal over a wireless channel of an unlicensed radio frequency spectrum band during a slot associated with a synchronization signal block. The operations of 1705 may be performed according to the methods described herein. In some examples, aspects of the operations of 1705 may be performed by a periodic CSI-RS timing component as described with reference to FIGS. 6 through 9.

At 1710, the UE may identify a transmission opportunity window for the periodic channel state information reference signal. The operations of 1710 may be performed according to the methods described herein. In some examples, aspects of the operations of 1710 may be performed by a periodic CSI-RS window component as described with reference to FIGS. 6 through 9.

At 1715, the UE may monitor for an indication that the channel state information reference signal is enabled. The operations of 1715 may be performed according to the methods described herein. In some examples, aspects of the operations of 1715 may be performed by a CSI-RS presence indication component as described with reference to FIGS. 6 through 9.

Figure 18:
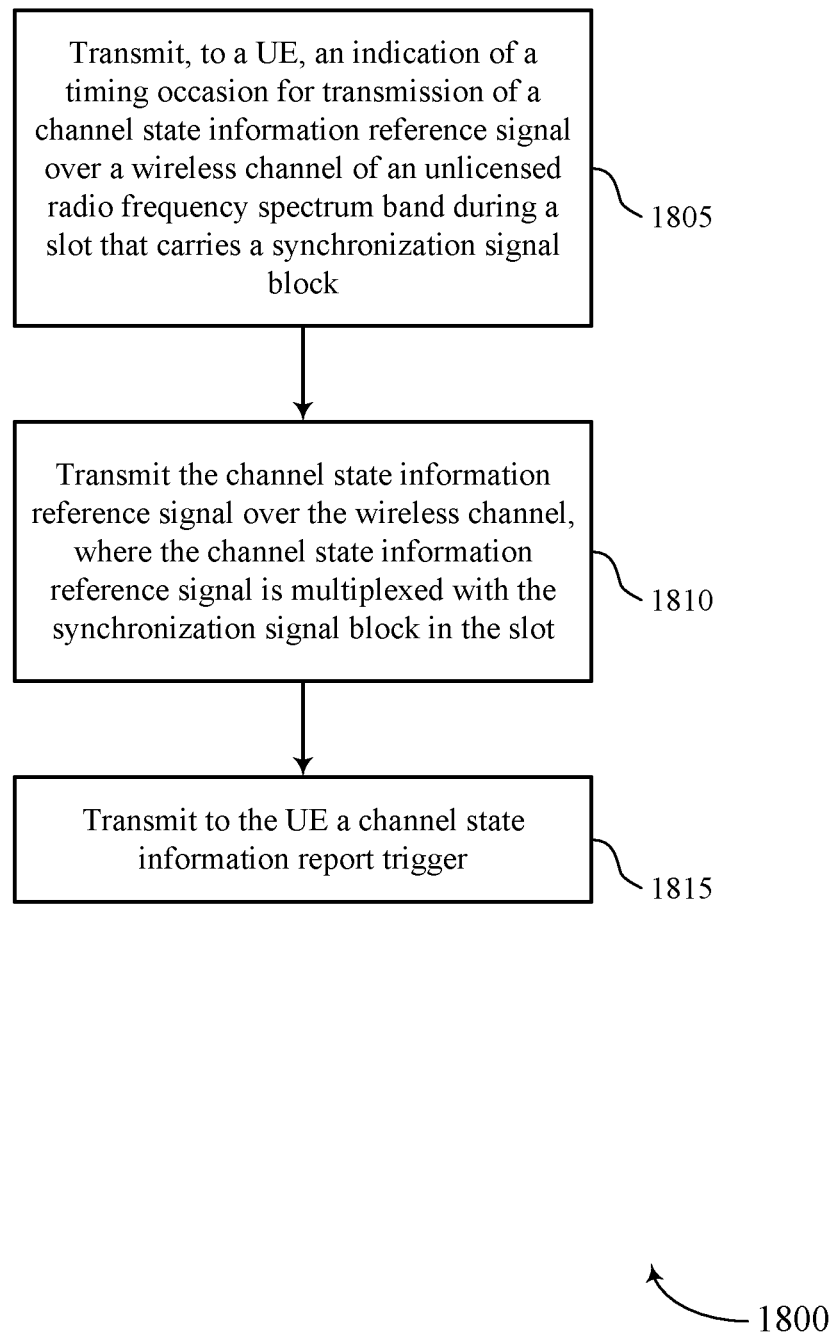

FIG. 18 shows a flowchart illustrating a method 1800 that supports channel state information reference signal multiplexing with synchronization signal blocks in accordance with aspects of the present disclosure. The operations of method 1800 may be implemented by a base station 105 or its components as described herein. For example, the operations of method 1800 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1805, the base station may transmit, to a UE, an indication of a timing occasion for transmission of a channel state information reference signal over a wireless channel of an unlicensed radio frequency spectrum band during a slot that carries a synchronization signal block. The operations of 1805 may be performed according to the methods described herein. In some examples, aspects of the operations of 1805 may be performed by a timing occasion indicating component as described with reference to FIGS. 10 through 13.

At 1810, the base station may transmit the channel state information reference signal over the wireless channel, where the channel state information reference signal is multiplexed with the synchronization signal block in the slot. The operations of 1810 may be performed according to the methods described herein. In some examples, aspects of the operations of 1810 may be performed by a CSI-RS transmitting component as described with reference to FIGS. 10 through 13.

At 1815, the base station may transmit to the UE a channel state information report trigger. The operations of 1815 may be performed according to the methods described herein. In some examples, aspects of the operations of 1815 may be performed by a CSI-RS report trigger component as described with reference to FIGS. 10 through 13.

Figure 19:
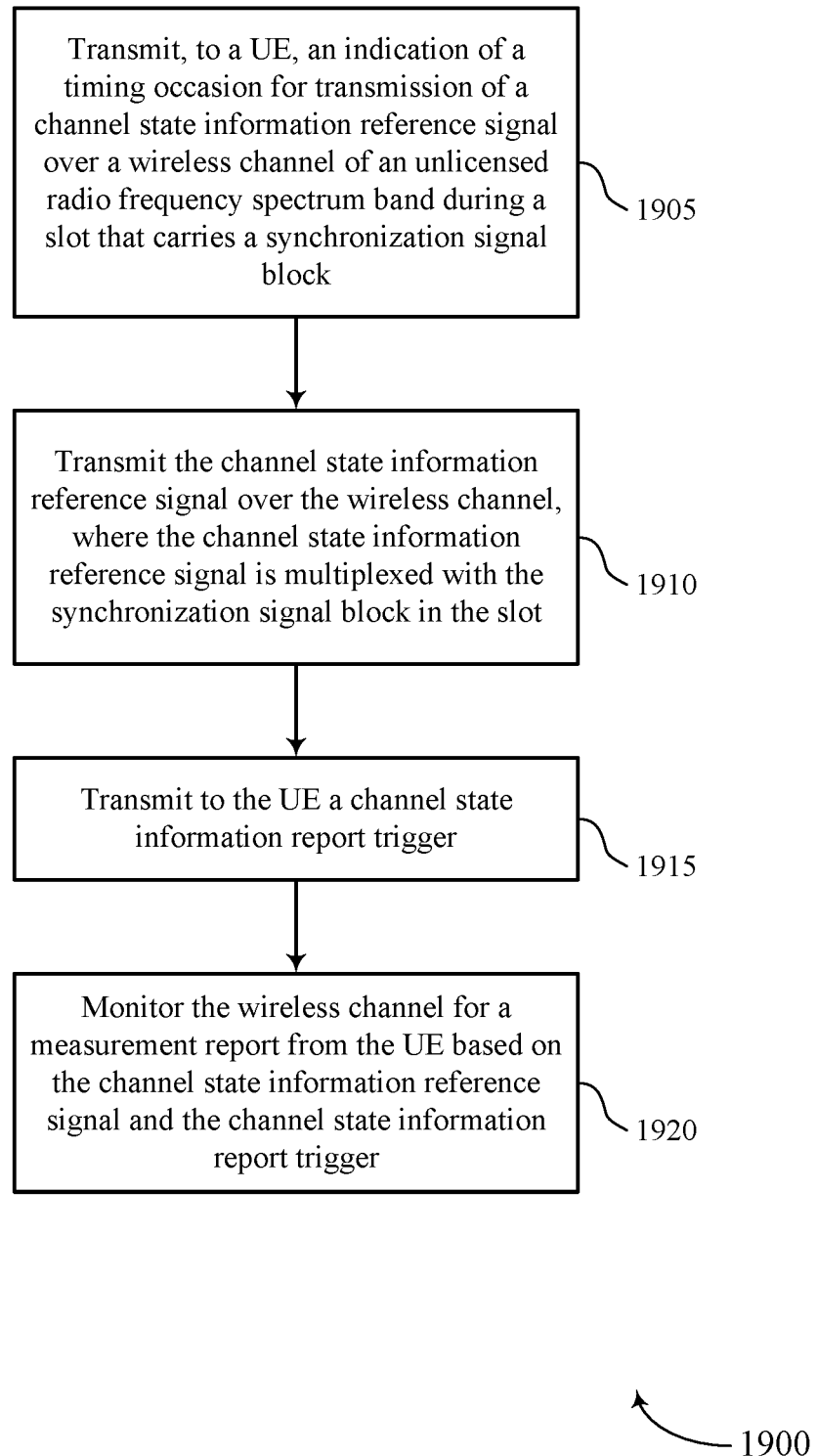

FIG. 19 shows a flowchart illustrating a method 1900 that supports channel state information reference signal multiplexing with synchronization signal blocks in accordance with aspects of the present disclosure. The operations of method 1900 may be implemented by a base station 105 or its components as described herein. For example, the operations of method 1900 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1905, the base station may transmit, to a UE, an indication of a timing occasion for transmission of a channel state information reference signal over a wireless channel of an unlicensed radio frequency spectrum band during a slot that carries a synchronization signal block. The operations of 1905 may be performed according to the methods described herein. In some examples, aspects of the operations of 1905 may be performed by a timing occasion indicating component as described with reference to FIGS. 10 through 13.

At 1910, the base station may transmit the channel state information reference signal over the wireless channel, where the channel state information reference signal is multiplexed with the synchronization signal block in the slot. The operations of 1910 may be performed according to the methods described herein. In some examples, aspects of the operations of 1910 may be performed by a CSI-RS transmitting component as described with reference to FIGS. 10 through 13.

At 1915, the base station may transmit to the UE a channel state information report trigger. The operations of 1915 may be performed according to the methods described herein. In some examples, aspects of the operations of 1915 may be performed by a CSI-RS report trigger component as described with reference to FIGS. 10 through 13.

At 1920, the base station may monitor the wireless channel for a measurement report from the UE based on the channel state information reference signal and the channel state information report trigger. The operations of 1920 may be performed according to the methods described herein. In some examples, aspects of the operations of 1920 may be performed by a measurement report component as described with reference to FIGS. 10 through 13.

Figure 20:
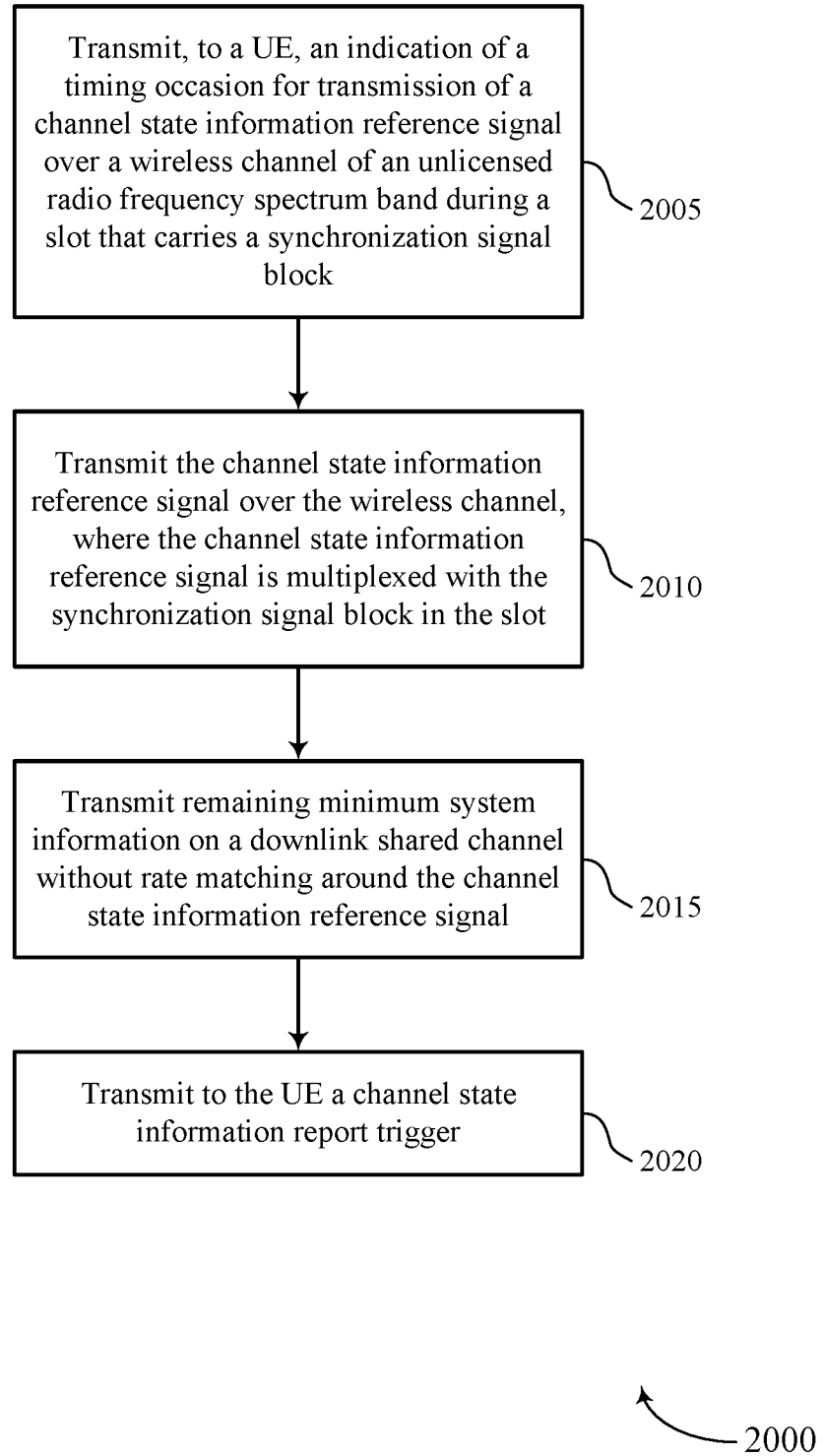

FIG. 20 shows a flowchart illustrating a method 2000 that supports channel state information reference signal multiplexing with synchronization signal blocks in accordance with aspects of the present disclosure. The operations of method 2000 may be implemented by a base station 105 or its components as described herein. For example, the operations of method 2000 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 2005, the base station may transmit, to a UE, an indication of a timing occasion for transmission of a channel state information reference signal over a wireless channel of an unlicensed radio frequency spectrum band during a slot that carries a synchronization signal block. The operations of 2005 may be performed according to the methods described herein. In some examples, aspects of the operations of 2005 may be performed by a timing occasion indicating component as described with reference to FIGS. 10 through 13.

At 2010, the base station may transmit the channel state information reference signal over the wireless channel, where the channel state information reference signal is multiplexed with the synchronization signal block in the slot. The operations of 2010 may be performed according to the methods described herein. In some examples, aspects of the operations of 2010 may be performed by a CSI-RS transmitting component as described with reference to FIGS. 10 through 13.

At 2015, the base station may transmit remaining minimum system information on a downlink shared channel without rate matching around the channel state information reference signal. The operations of 2015 may be performed according to the methods described herein. In some examples, aspects of the operations of 2015 may be performed by a RMSI transmitting component as described with reference to FIGS. 10 through 13.

At 2020, the base station may transmit to the UE a channel state information report trigger. The operations of 2020 may be performed according to the methods described herein. In some examples, aspects of the operations of 2020 may be performed by a CSI-RS report trigger component as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving, from a network entity, an indication of an aperiodic timing occasion for transmission of a channel state information reference signal via a wireless channel of an unlicensed radio frequency spectrum band;
   measuring the channel state information reference signal during the aperiodic timing occasion based at least in part on the indication;
   receiving downlink control information comprising a downlink grant with a channel state information request field and a channel state information report trigger to transmit a measurement report for the channel state information reference signal, wherein the channel state information report trigger is separate from the indication of the aperiodic timing occasion; and
   transmitting the measurement report to the network entity on the wireless channel based at least in part on the channel state information report trigger.

2. The method of claim 1, wherein the downlink control information comprises an uplink grant without a deterministic uplink channel resource for reporting the measurement report.

3. The method of claim 2, wherein the uplink grant is directed to a group of monitoring UEs including the UE, the group of monitoring UEs further including connected UEs, idle UEs, UEs configured to monitor for a system information radio network temporary identifier, UEs configured to monitor for a paging radio network temporary identifier, UEs configured to monitor for a group common identifier, or any combination thereof.

4. The method of claim 2, wherein the downlink control information comprises a timing offset parameter indicating that the channel state information report trigger is transmitted in a separate transmission after the indication of the aperiodic timing occasion.

5. The method of claim 1, wherein the downlink grant is directed to a group of monitoring UEs including the UE, the group of monitoring UEs further including connected UEs, idle UEs, UEs configured to monitor for a system information radio network temporary identifier, UEs configured to monitor for a paging radio network temporary identifier, UEs configured to monitor for a group common identifier, or any combination thereof.

6. The method of claim 1, wherein the downlink grant indicates resources for a common channel, wherein the common channel comprises a remaining minimum system information downlink shared channel, a paging downlink shared channel, an other system information downlink shared channel, or a combination thereof.

7. The method of claim 1, further comprising:
   identifying a channel state information configuration as part of a serving cell configuration associated with the network entity, wherein the channel state information report trigger is based at least in part on the channel state information configuration.

8. The method of claim 1, wherein detecting the channel state information report trigger further comprises:
   detecting a trigger to transmit the measurement report for a latest received channel state information reference signal.

9. The method of claim 1, further comprising:
   identifying a quasi co-location relationship for receiving the channel state information reference signal based at least in part on one or more of the channel state information reference signal being multiplexed with a synchronization signal block, a proximity of the channel state information reference signal to a synchronization signal block, the channel state information reference signal overlapping with a half-slot comprising a synchronization signal block, a synchronization signal block immediately succeeding the channel state information reference signal, or a quasi co-location parameter.

10. The method of claim 1, further comprising:
    receiving an indication of a configuration for the channel state information reference signal via the downlink control information or a physical broadcast channel message.

11. The method of claim 1, further comprising:
    rate matching a remaining minimum system information transmission around the channel state information reference signal, wherein the channel state information reference signal is a non-zero power channel state information reference signal or a zero power channel state information reference signal.

12. A method for wireless communication at a network entity, comprising:
    transmitting, to a user equipment (UE), an indication of a timing occasion for transmission of a channel state information reference signal via a wireless channel of an unlicensed radio frequency spectrum band during a slot that carries a synchronization signal block, wherein the channel state information reference signal is an aperiodic channel state information reference signal;
    transmitting the channel state information reference signal over the wireless channel, wherein the channel state information reference signal is multiplexed with the synchronization signal block in the slot; and
    transmitting, to the UE, downlink control information comprising a downlink grant with a channel state information request field and a channel state information report trigger.

13. The method of claim 12, further comprising:
    monitoring the wireless channel for a measurement report from the UE based at least in part on the channel state information reference signal and the channel state information report trigger.

14. The method of claim 12, further comprising:
    transmitting remaining minimum system information via a downlink shared channel without rate matching around the channel state information reference signal.

15. The method of claim 12, wherein transmitting the channel state information report trigger further comprises:
    triggering the UE to transmit a measurement report for a latest received channel state information reference signal.

16. An apparatus for wireless communication at a user equipment (UE), comprising:
    a processor,
    memory coupled with the processor; and
    instructions stored in the memory and executable by the processor to cause the apparatus to:
       receive, from a network entity, an indication of an aperiodic timing occasion for transmission of a channel state information reference signal via a wireless channel of an unlicensed radio frequency spectrum band;

measure the channel state information reference signal during the aperiodic timing occasion based at least in part on the indication;

receive downlink control information comprising a downlink grant with a channel state information request field and a channel state information report trigger to transmit a measurement report for the channel state information reference signal, wherein the channel state information report trigger is separate from the indication of the aperiodic timing occasion; and transmit the measurement report to the network entity on the wireless channel based at least in part on the channel state information report trigger.

17. The apparatus of claim 16, wherein the downlink control information comprises an uplink grant without a deterministic uplink channel resource for reporting the measurement report.

18. The apparatus of claim 17, wherein the uplink grant is directed to a group of monitoring UEs including the UE, the group of monitoring UEs further including connected UEs, idle UEs, UEs configured to monitor for a system information radio network temporary identifier, UEs configured to monitor for a paging radio network temporary identifier, UEs configured to monitor for a group common identifier, or any combination thereof.

19. The apparatus of claim 17, wherein the downlink control information comprises a timing offset parameter indicating that the channel state information report trigger is transmitted in a separate transmission after the indication of the aperiodic timing occasion.

20. The apparatus of claim 16, wherein the downlink grant is directed to a group of monitoring UEs including the UE, the group of monitoring UEs further including connected UEs, idle UEs, UEs configured to monitor for a system information radio network temporary identifier, UEs configured to monitor for a paging radio network temporary identifier, UEs configured to monitor for a group common identifier, or any combination thereof.

21. The apparatus of claim 16, wherein the downlink grant indicates resources for a common channel, wherein the common channel comprises a remaining minimum system information downlink shared channel, a paging downlink shared channel, an other system information downlink shared channel, or a combination thereof.

22. The apparatus of claim 16, wherein the instructions are further executable by the processor to cause the apparatus to:

identifying a channel state information configuration as part of a serving cell configuration associated with the network entity, wherein the channel state information report trigger is based at least in part on the channel state information configuration.

23. The apparatus of claim 16, wherein the instructions to detect the channel state information report trigger are further executable the processor to cause the apparatus to:

detect a trigger to transmit the measurement report for a latest received channel state information reference signal.

24. An apparatus for wireless communication at a network entity, comprising:

a processor, memory coupled with the processor; and instructions stored in the memory and executable by the processor to cause the apparatus to:

transmit, to a user equipment (UE), an indication of a timing occasion for transmission of a channel state information reference signal via a wireless channel of an unlicensed radio frequency spectrum band during a slot that carries a synchronization signal block, wherein the channel state information reference signal is an aperiodic channel state information reference signal;

transmit the channel state information reference signal over the wireless channel, wherein the channel state information reference signal is multiplexed with the synchronization signal block in the slot; and transmit, to the UE, downlink control information comprising a downlink grant with a channel state information request field and a channel state information report trigger.

25. The apparatus of claim 24, wherein the instructions are further executable by the processor to cause the apparatus to:

monitor the wireless channel for a measurement report from the UE based at least in part on the channel state information reference signal and the channel state information report trigger.

26. The apparatus of claim 24, wherein the instructions are further executable by the processor to cause the apparatus to:

transmit remaining minimum system information via a downlink shared channel without rate matching around the channel state information reference signal.

27. The apparatus of claim 24, wherein, to transmit the channel state information report trigger, the instructions are executable by the processor to cause the apparatus to:

trigger the UE to transmit a measurement report for a latest received channel state information reference signal.

28. The apparatus of claim 24, wherein the downlink control information comprises an uplink grant without a deterministic uplink channel resource for reporting a measurement report.

29. The apparatus of claim 28, wherein the uplink grant is directed to a group of monitoring UEs including the UE, the group of monitoring UEs further including connected UEs, idle UEs, UEs configured to monitor for a system information radio network temporary identifier, UEs configured to monitor for a paging radio network temporary identifier, UEs configured to monitor for a group common identifier, or any combination thereof.

* * * * *